United States Patent [19]

Sasagawa

[11] Patent Number: 5,737,312
[45] Date of Patent: Apr. 7, 1998

[54] CELL ASSEMBLY AND DISASSEMBLY APPARATUS IN AN ATM NETWORK

[75] Inventor: Yasushi Sasagawa, Kawasaki, Japan

[73] Assignee: Fujitsu Limited, Kanagawa, Japan

[21] Appl. No.: 759,452

[22] Filed: Dec. 5, 1996

Related U.S. Application Data

[63] Continuation of Ser. No. 529,520, Sep. 18, 1995, abandoned.

[30] Foreign Application Priority Data

Jan. 30, 1995 [JP] Japan ................................. 7-012213

[51] Int. Cl.⁶ .................................................. H04L 12/56
[52] U.S. Cl. ........................ 370/232; 370/253; 370/395; 370/468; 370/474; 370/905
[58] Field of Search ................................ 370/229, 230, 370/232, 250, 252, 253, 389, 395, 398, 465, 468, 474, 477, 905

[56] References Cited

U.S. PATENT DOCUMENTS

| | | | |
|---|---|---|---|
| 5,333,131 | 7/1994 | Tanabe et al. | 370/60 |
| 5,392,402 | 2/1995 | Robrock, II | 370/60.1 |
| 5,490,141 | 2/1996 | Lai et al. | 370/60.1 |
| 5,541,926 | 7/1996 | Saito et al. | 370/94.2 |

FOREIGN PATENT DOCUMENTS

| | | |
|---|---|---|
| 3-89744 | 4/1991 | Japan. |
| 4-340830 | 11/1992 | Japan. |

*Primary Examiner*—Alpus H. Hsu
*Attorney, Agent, or Firm*—Helfgott & Karas, P.C.

[57] ABSTRACT

A call processor performs call set-up/release processing based upon absence/presence of valid data from an SVC service terminal and either decreases or increases an idle band of the network by an amount equivalent to the assigned band of the SVC service terminal. Further, the call controller sends a network an OAM cell for band assignment or am OAM cell for canceling band assignment based upon absence/presence of valid data from a PVC service terminal and either decreases or increases an idle band of the network by an amount equivalent to the assigned band of the PVC service terminal. In a case where the transfer rate of data sent from terminal is high, a band assignment controller send the network an OAM cell for retesting band increase, increases the assigned band of the terminal by a prescribed amount and decreases the idle band by an amount equivalent to the increase in the assigned band. In a case where the transfer rate of data sent from terminal is low, the band assignment controller sends the network an OAM cell for requesting band decrease, decreases the assigned band of the terminal by a prescribed amount and increases the idle band by an amount equivalent to the decrease in the assigned band.

18 Claims, 27 Drawing Sheets

FIG. 6

| PORT NO. | REQUIRED BAND (ASSIGNED BAND) 22a | SVC or PVC 22b | IN-USE INDICATION 22c | TERMINAL NO. 22d | TERMINATING TERMINAL NO. 22e | SIGNAL VCI 22f | OTHER ATTRIBUTES 22g |
|---|---|---|---|---|---|---|---|
| FIRST PORT | $F_1$ | | | | | | |
| SECOND PORT | $F_2$ | | | | | | |
| ---- | ---- | | | | | | |
| n-th PORT | $F_n$ | | | | | | |

FIG. 11A
OAM CELL FORMAT (F4 FLOW)

| ATM Cell Header 5 Octets | | | | | | ATM Cell Payload 48 Octets | | | |
|---|---|---|---|---|---|---|---|---|---|
| | | | | | | 4 Bits | 4 Bits | 45 Octets | 6 Bits | 10 Bits |
| GFC | VPI | VCI | PT | CLP | HEC | OAM Cell Type | Function Type | Function Specific Field | Reserve | EDC |

⇧ VCI=3 (Segment OAM Cell)
⇧ VCI=4 (End-to-End OAM Cell)
⇧ Same As User Cell

FIG. 11B
OAM CELL FORMAT (F5 FLOW)

| ATM Cell Header 5 Octets | | | | | | ATM Cell Payload 48 Octets | | | |
|---|---|---|---|---|---|---|---|---|---|
| | | | | | | 4 Bits | 4 Bits | 45 Octets | 6 Bits | 10 Bits |
| GFC | VPI | VCI | PT | CLP | HEC | OAM Cell Type | Function Type | Function Specific Field | Reserve | EDC |

⇧ PT=100 (Segment OAM Cell)
⇧ PT=101 (End-to-End OAM Cell)
⇧ Same As User Cell

FIG. 12

| CODING | | | |
|---|---|---|---|
| OAM Cell Type | 4 BITS | Function Type | 4 BITS |
| Fault Management | 0001 | AIS | 0000 |
| | | FERF | 0001 |
| | | Continuity Check | 0100 |
| | | Loopback | 0010 |
| Performance Management | 0010 | Forward Monitoring | 0000 |
| | | Backward Reporting | 0001 |
| | | Monitoring & Reporting | 0010 |
| Activation/ Deactivation | 1000 | Performance Monitoring | 0000 |
| | | Continuity Check | 0001 |

FIG. 14A

FORMAT 1: Function Specific Field 45 Octets
- 1 Octet: Function ID
- 44 Octets: Reserve

FIG. 14B

FORMAT 2: Function Specific Field 45 Octets
- 1 Octet: Function ID
- 1 Octet: Acknowledge ID
- 43 Octets: Reserve

FIG. 14C

FORMAT 3: Function Specific Field 45 Octets
- 1 Octet: Function ID
- 3 Octets: Forward Peak Cell Rate(CLP=0)
- 3 Octets: Backward Peak Cell Rate(CLP=0)
- 3 Octets: Forward Peak Cell Rate(CLP=1)
- 3 Octets: Backward Peak Cell Rate(CLP=1)
- 32 Octets: Reserve

FIG. 15

| FIELD NAME | CODING VALUE | MEANING | REMARKS |
|---|---|---|---|
| Function ID | 00000010 | REQUEST FOR START OF BAND USE | FORMAT 1 |
| | 00000011 | ANSWER FOR START OF BAND USE | FORMAT 2 |
| | 00000100 | NOTIFY OF END OF BAND USE | FORMAT 1 |
| | 00000101 | ANSWER FOR END OF BAND USE | FORMAT 2 |
| | 00000110 | REQUEST FOR INCREASE OF BAND ASSIGNMENT | FORMAT 3 |
| | 00000111 | ANSWER FOR INCREASE OF BAND ASSIGNMENT | FORMAT 2 |
| | 00001000 | REQUEST FOR DECREASE OF BAND ASSIGNMENT | FORMAT 3 |
| | 00001001 | ANSWER FOR DECREASE OF BAND ASSIGNMENT | FORMAT 2 |
| Acknowledge ID | 00000000 | AFFIRMATIVE ANSWER | |
| | 00000001 | NEGATIVE ANSWER | |
| Forward Peak Cell Rate (CLP=0) | VALUE OF ANY THREE OCTETS | INDICATE NUMBER OF CELLS PER MINUTE BY INTEGRAL VALUE | |
| Backward Peak Cell Rate (CLP=0) | VALUE OF ANY THREE OCTETS | INDICATE NUMBER OF CELLS PER MINUTE BY INTEGRAL VALUE | |
| Forward Peak Cell Rate (CLP=1) | VALUE OF ANY THREE OCTETS | INDICATE NUMBER OF CELLS PER MINUTE BY INTEGRAL VALUE | |
| Backward Peak Cell Rate (CLP=1) | VALUE OF ANY THREE OCTETS | INDICATE NUMBER OF CELLS PER MINUTE BY INTEGRAL VALUE | |

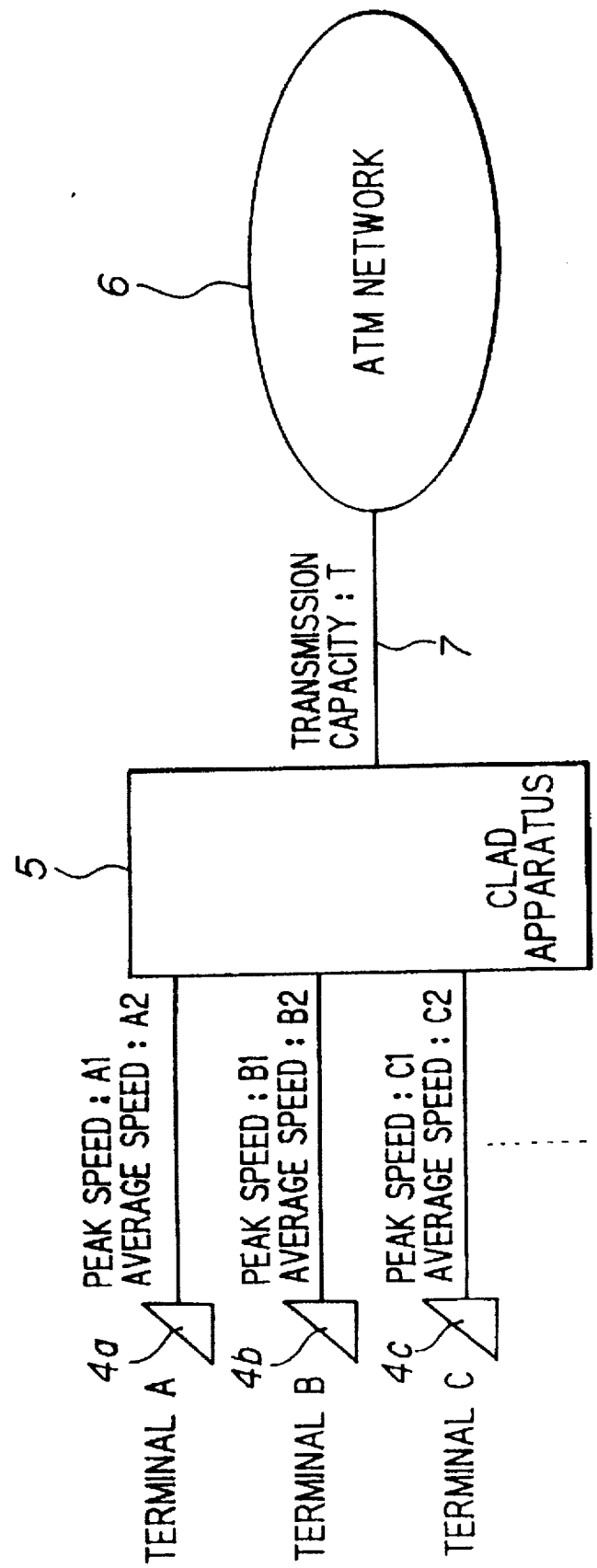

CELL ASSEMBLY AND DISASSEMBLY APPARATUS IN AN ATM NETWORK

This is a continuation of application Ser. No 08/529,520, filed Sep. 18 1995, now abandoned.

BACKGROUND OF THE INVENTION

This invention relates to a terminal adapter in an ATM network. More particularly, the invention relates to a CLAD (cell assembly and disassembly) apparatus for accommodating a plurality of terminals in an ATM network and managing a band assigned to each terminal.

There is growing demand for multimedia communication inclusive not only of audio communication and data communication but also of moving images. A B-ISDN (broadband-ISDN) switching technique based upon an asynchronous transfer mode (ATM) is being put into practice as for implementing such broadband communication.

ATM transmission involves converting all information to fixed information, referred to as cells, and transferring the cells at high speed. More specifically, ATM transmission involves allocating lines to a plurality of calls by establishing logical links on physical lines multiplexed fashion. Moving-picture data, audio data and the like from a terminal conforming to each call are disassembled into information units (cells) of fixed length and the cells are successively transmitted on a line to achieve multiplexing.

As shown in FIG. 26, a cell is constituted by a fixed-length block of 53 bytes, of which five bytes form a header HD and 48 bytes form an information field DT. The header HD includes a virtual channel identifier (VCI) for call identification. The VCI allows the destination to be ascertained even after data has been disassembled into blocks. The header HD further includes a virtual path identifier (VPI) for specifying a path, a generic flow control (GFC) used in flow control between links, payload type (PT), cell loss priority (CLP) header error control (HEC), etc.

FIG. 27, which is a diagram showing the general configuration of ATM network, is useful in describing ATM transmission. ATM terminals 1a, 1b are connected to an ATM network 3. The ATM network 3 is equipped with an information network 3a that transmits data cells and a signal network 3b that transmits control signals. Call processors (CPUs) 3d-1–3d-n of respective ATM exchanges 3c-1–3c-n in the information network 3a are connected to the network 3b.

When a call operation in which the originating terminal 1a calls the terminating terminal 1b is performed, a cell assembler within the originating terminal splits SET-UP message (data including an originating number, terminating number, terminal type, average cell speed and maximum cell speed) into cell units, attaches a signal VCI (decided in advance for each terminal) to each item of split data to generate a cell signal (a control cell) and sends the cell signal to the ATM network 3.

When a signal device in the ATM exchange (the exchange on the originating side) 3c-1 receives the signal cell, the information contained in the signal cell is assembled and communicated to the CPU 3d-1. The CPU executes call processing, such as calling-party service analysis, tariff processing and called-party numeric compilation, based upon the received message, decides path identification information (VPI) and call identification information (VCI) on the basis of reported average cell speed and maximum cell speed, etc., and then transmits the SET-UP message, which includes the originating number, terminating number, VPI, VCI and other data, to the next relay ATM exchange 3c-2 via the signal network 3b in accordance with a No. 7 protocol. The relay exchange 3c-2 performs processing the same as that executed by the originating exchange 3c-1, and so do each of the other relay exchanges. Finally, a path is decided from the originating exchange 3c-1 to the ATM exchange (terminating exchange) 3c-n, to which the terminating terminal is connected, and the relay ATM exchanges 3c-2, 3c-3, ... are decided as well. Upon receiving the SET-UP message that includes the originating number, terminating number and VCI of the higher-order ATM exchange 3c-3, the terminating exchange 3c-n assigns a prescribed VCI to the terminating terminal 1b. If the terminating terminal 1b is capable of communicating, the terminal 1b sends an ALT message indicative of this fact to the originating exchange 3c-1 via the signal network 3b, in response to which the originating exchange 3c-1 assigns a prescribed VCI to the originating terminal 1a. After transmitting the ALT signal, the terminating terminal 1b sends a CONN message to the originating terminal 1a via the signal network 3b when the called party answers. This makes communication possible.

Each of the ATM exchanges 3c-1–3c-n on the path registers the following, for each and every path, in an internal routing table in correspondence with the VCI of the higher-order ATM exchange: (1) information (referred to as routing information or tag information) for specifying the outgoing line of the cell having the above-mentioned VCI, and (2) a new VCI and VPI to be added onto the outputted cell.

At the time of data communication, the originating terminal 1a disassembles the data to be transmitted into prescribed byte lengths, adds on a header containing the assigned VCI to generate a data cell and sends the data cell to the ATM 3. When the data cell enters each of the ATM exchanges 3c-1–3c-n from the higher-order exchange via the prescribed incoming highway (in line), each ATM refers to its own routing table, replaces the VPI/VCI of the entered data cell and sends the data cell out on the prescribed outgoing highway (out line) based upon the tag information. As a result, the data cell outputted by the originating terminal 1a reaches the terminating exchange 3c-n via the path decided by call control. The terminating exchange 3c-n refers to its routing table, replaces the VCI, which has been added onto the entered cell, with the VCI assigned to the terminating terminal and then sends the data cell out on the line to which the terminating terminal 1b is connected.

The originating terminal 1a thenceforth sends data cells to the terminating terminal 1b in successive fashion and the terminating terminal assembles the information field DT contained in the received cells, thereby restoring the original data.

The foregoing is for a case concerning one call. However, by changing the VCI values shared at both ends of each line between a terminal and an ATM exchange and between mutually adjacent ATM exchanges, logical links conforming to a number of calls can be established on one line, as a result of which high-speed multiplexed communication may be achieved. In accordance with ATM transmission, it is possible to multiplex information from information sources having different transmission speeds, such as sources of moving pictures, data and audio. As a result, one transmission line can be utilized effectively and there is no need for resend control or complicated communication procedures of the kind implemented with software using packet exchange. This makes possible ultra-fast data transmission on the order of 150 to 600 Mbps.

The foregoing is for a case in which ATM terminals are assumed to be the originating and terminating terminals.

However, there is no need to limit terminals to ATM terminals. In other words, a non-ATM terminal can be accomplished in an ATM network by introducing a CLAD (cell assembly and disassembly) apparatus which accommodates an interface terminal in the ATM network. FIG. 28 is a diagram showing the configuration of a network a CLAD apparatus. Shown in FIG. 28 are terminals 4a–4c (it does not matter whether these are ATM or terminals), a CLAD apparatus 5 which accommodates the ATM network, and an ATM network 6. Data that has entered from each terminal is formed into cells in the CLAD apparatus 5, multiplexed and sent to the ATM network 6. Multiplexed cells that have entered from the ATM network 3 are separated by destination within the CLAD apparatus 5, after which they are disassembled into data handled by the terminals and then entered into the terminals.

In ATM transmission, various types of traffic having different information speeds and burst properties (burst refers to momentary generation of a large quantity of information) are handled in integrated fashion. Consequently, if the traffic mixture includes particularly bursty traffic, then it will no longer be possible to provide the service quality (cell discard rate, delay, etc.) required by the user unless call acceptance or band management control is performed properly. For this reason, the ATM exchange determines whether the prescribed transmission line has a vacancy for the required band. This determination is based on the average cell speed and maximum cell speed reported by the user (terminal) and the maximum possible band of the transmission line. If a vacancy exists, the ATM exchange accepts the call; otherwise, the call is refused.

A first method of call acceptance control according to the prior art involves deciding whether a call is to be accepted or not by regarding the maximum cell speed (peak speed) of a call as the required band. A second conventional method involves deciding whether a call is to be accepted or not by regarding the average cell speed (average speed) of a call as the required band.

The first control method involves controlling call acceptance in such a manner that the total sum of peak speeds of accepted calls will not exceed the maximum transmission capacity (maximum possible band) T of the transmission line. Since the total of the bands used does not exceed the maximum transmission capacity of the transmission line, the service quality (cell discard rate, delay, etc.) required by the user can be met with certainty. With the first control method, however, the number of calls capable of being allocated to a transmission line diminishes and there is a decline in the efficiency with which the transmission line is utilized. More specifically, with the first control method, assume that the peak speeds of the terminals are A1, B1, C1, ... and that the average speeds are A2, B2, C2, ... The number of terminals that can be connected simultaneously satisfies the following condition:

T>A1+B1+C1

Consequently, at the time of ordinary traffic (average traffic), a band equivalent to (A1+B1+C1...)−(A2+B2+C2...)

is not used. This represents a decline in the utilization efficiency of the transmission line.

The second control method involves controlling call acceptance in such a manner that the total sum of average speeds of accepted calls will not exceed the maximum transmission capacity T. In comparison with the first control method, a greater number of calls can be assigned to the transmission line, thereby making it possible to raise the utilization efficiency of the transmission line. However, when assignment by average cell speed is performed, the band of the transmission line is exceeded, and cells are discarded, in a case where the peaks of calls overlap. As a result, the desired cell discard rate cannot be satisfied and, on the receiving side, sound becomes sporadic, images are omitted and data lost. More specifically, with the second control method, assume that the peak speeds of the terminals are A1, B1, C1, ... and that the average speeds are A2, B2 C2, ... The number of terminals that can be connected simultaneously satisfies the following condition:

T>A2+B2+C2...

Consequently, at the time of peak traffic, a transmission capacity equivalent to (A1+B1+C1...)−(A2+B2+C2...)

is exceeded and a large quantity of cell loss occurs.

Further, with the first and second control methods, the assigned band is occupied by a call during the set-up of the call. Even if data is not actually flowing, the band cannot used for other calls and, hence, the transmission line cannot be used efficiently.

Further, with the first and second control methods, a band assigned to a terminal which accommodates a PVC (permanent virtual channel) service cannot be used for other calls even if data does not actually flow from the terminal for the PVC service.

SUMMARY OF THE INVENTION

Accordingly, a first object of the present invention is to provide a CLAD apparatus capable of raising the efficiency with which a transmission line is utilized (the efficiency with which a band is used) and of furnishing the service quality (cell discard rate, delay) required by the user.

A second object of the present invention is to provide a CLAD apparatus which allows a band to be utilized effectively by executing call set-up processing for a terminal when the presence of valid data from the terminal has been sensed and executing call release processing for terminal when valid data is no longer sensed.

A third object of the present invention is to provide a CLAD apparatus which enables a band to be utilized effectively by allowing use of a band, which has been assigned to a terminal in advance, in response to the presence of valid data even if the terminal is a terminal for an accommodating SVC (switched virtual channel) service or a PVC (permanent virtual channel) service, and causing release of the band in response to absence of valid data.

A fourth object of the present invention is to provide a CLAD apparatus which allows a band to be utilized effectively, while avoiding network congestion, by dynamically changing a band, which has been assigned to each terminal, on the basis of the actual data transfer rate (traffic) from the terminal.

A fifth object of the present invention is to provide a CLAD apparatus which allows the number of required facilities to be reduced at the time of system construction.

According to the present invention, the foregoing objects are attained by providing a CLAD apparatus for accommodating a plurality of terminals in an ATM network and managing a band assigned to each terminal, comprising means for storing, in correspondence with each terminal, an assigned band of the terminal and whether the terminal is a terminal which accommodates an SVC (switched virtual channel) service or a PVC (permanent virtual channel) service; a data absence/presence detecting unit for detecting absence/presence of data sent from each terminal; call processing means which, when data sent from a terminal is detected, determines whether the assigned band of the terminal is smaller than a present idle band of the network and, if terminal is the SVC service terminal in a case where the assigned band is smaller, executes call set-up processing and decreases the idle band by an amount equivalent to the assigned band of the SVC service terminal, and which, when absence of data from the SVC service terminal is detected, executes call release processing and increases the idle band by an amount equivalent to the assigned band of the SVC service terminal; and a cell assembly/disassembly unit for assembling data into a cell after establishment of connection by the call set-up processing, sending the cell to the network, disassembling a data cell from the network into data and sending the data to a terminal.

Further, according to the present invention, the foregoing objects are attained by providing a CLAD apparatus for accommodating a plurality of terminals in an ATM network and managing a band assigned to each terminal, comprising means for storing an assigned band of each terminal; a data quantity monitoring unit for monitoring a quantity of data sent from each terminal; a band assignment controller which, in a case where transfer rate of data sent from a terminal is high, sends an operation, administration and maintenance (OAM) cell for requesting band increase and, when an affirmative response to the OAM cell is received from the network, increases the assigned band of the terminal by a prescribed amount and decreases an idle band by an amount equivalent to the increase in the assigned band, and which, in a case where transfer rate of data sent from a terminal is low, sends an OAM cell for requesting band decrease and, when an affirmative response to the OAM cell is received from the network, decreases the assigned band of the terminal by a prescribed amount and increases an idle band by an amount equivalent to the decrease in the assigned band; and a cell assembly/disassembly unit for assembling data into a cell, sending cell to the network, disassembling a data cell from the network into data and sending the data to a terminal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a diagram showing the constitution of a port accommodation data unit;

FIGS. 11A, 11B are diagrams showing the constitution of OAM cells;

FIG. 12 is a correspondence table showing OAM cell type and function type;

FIGS. 14A, 14B and 14C are diagrams for describing examples of definitions of OAM cells for band management;

FIG. 15 is a table for describing function specific fields of OAM cells for band management;

FIG. 28 is a diagram showing the configuration of a network using a CLAD apparatus.

DESCRIPTION OF THE PREFERRED EMBODIMENTS (A) Overview of the invention

Figure 1:
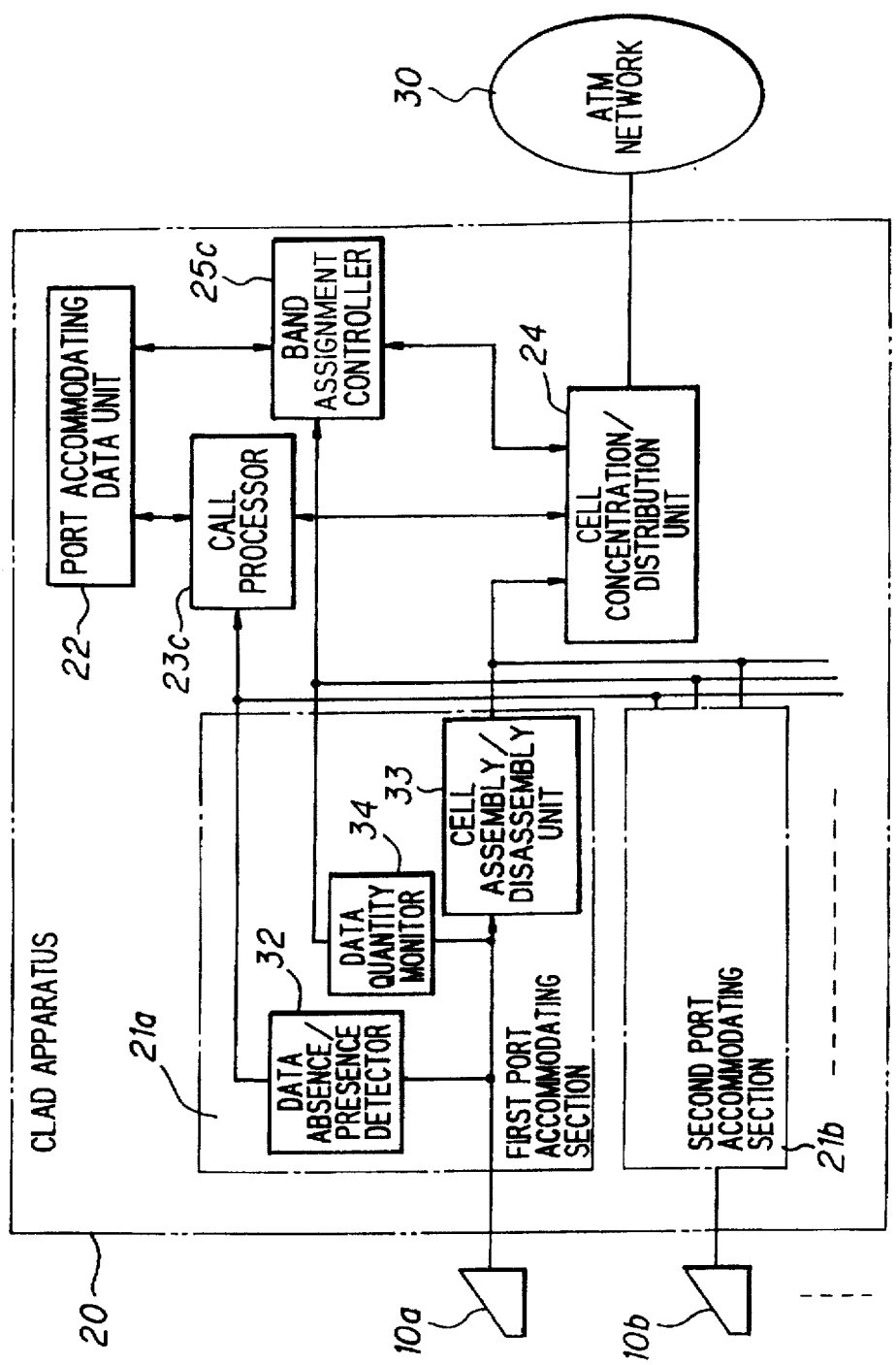
FIG. 1 is a block diagram for describing the principles of the present invention.

FIG. 1 is a block diagram for describing the general features of the present invention. Shown in FIG. 1 are terminals 10a, 10b, . . . , a CLAD apparatus 20 and an ATM network 30. The CLAD apparatus 20 includes port accommodating units 21a, 21b, . . . to which respective ones of the terminals are connected; a port accommodating data unit 22 for storing, in correspondence with each port accommodating unit (port number), the assigned band of the terminal and whether the terminal is a terminal which accommodates an SVC (switched virtual channel) service or a PVC (permanent virtual channel) service; a data absence/presence detecting unit 32 for detecting absence/presence of data sent from each terminal; a data quantity monitoring unit 34 for measuring the quantity (transfer rate) of data sent from each terminal; means (cell assembly and disassembly unit) 33 for assembling data into a cell after establishment of connection by the call set-up processing, sending the cell to the network, disassembling a data cell from the network into data and sending the data to a terminal; a call processor 23c for executing call set-up or call release processing based upon absence/presence of valid data sent from a terminal; a band assignment controller 25c for changing assigned band dynamically based upon the transfer rate of the data sent from a terminal; and a cell concentrating/distributing unit 24 for multiplexing, and sending to the network 30, data cells outputted by the cell assembly/disassembly unit 33 provided for each port and cells outputted by the call processor 23c and band assignment controller 25c, and for distributing multiplexed cells which have entered from the network 30 to a prescribed cell assembly/disassembly unit or to the call processor or band assignment controller.

In correspondence with the port numbers to which the terminals 10a, 10b, ... are connected, the assigned bands of these terminals, as well as whether the terminals are terminals which accommodate an SVC (switched virtual channel) service or a PVC (permanent virtual channel) service, are stored in the port accommodating data unit 22. When valid data outputted by an SVC terminal is detected by the data absence/presence detecting unit 32, the call processor 23c executes call set-up processing in a case where the assigned band of this terminal is smaller than the present idle band and decreases the idle band by an amount equivalent to the assigned band of the SVC terminal. Further, when absence of valid data from the SVC terminal is detected by the data absence/presence detecting unit 32, the call processor 23c executes call release processing and decreases the idle band by an amount equivalent to the assigned band of the SVC terminal. In this case, the data absence/presence detecting unit 32 detects the absence/presence of valid data every unit of time, obtains a count of the number of times the valid data is detected per set time and determines that data is present in a case where the count of the number of detections of valid data is greater than a set number. Further, the data absence/presence detecting unit 32 detects the absence/presence of valid data every unit of time and judges that data is absent in a case where valid data fails to be detected successively a number of times greater than the set number of times.

When valid data outputted by the PVC terminal is detected, the call processor 23c sends an OAM cell for band assignment to the network. When an affirmative response to the OAM cell is received from the network, the call processor 23c decreases an idle band by an amount equivalent to the assigned band of the PVC terminal. When absence of data from the PVC terminal is detected, the call processor 23c sends the network an OAM cell for assigned band cancellation. When an affirmative response to the OAM cell is received from the network, the call processor 23c increases the idle band by an amount equivalent to the assigned band of the PVC terminal.

Thus, call set-up and call release are carried out depending upon the absence/presence of valid data. Therefore, if data is not being sent from a terminal, the band assigned to this terminal can be released and assigned to another terminal so that the band can be used effectively.

Further, even if a terminal is an SVC (switched virtual channel) service terminal or a PVC (permanent virtual channel) service terminal, the band assigned to this terminal beforehand is allowed to be used in response to the presence of valid data and the band is released in the absence of valid data, thereby allowing the band to be utilized effectively.

Furthermore, since an arrangement is adopted in which the port accommodating data unit and call processor are provided so as to be shared by each port, cells outputted by the cell assembly/disassembly unit and call processor provided to correspond to each port are multiplexed and sent to the network, and a cell concentrating/distributing unit for distributing multiplexed cells that have entered from the network to a prescribed cell assembly/disassembly unit or to the call processor is provided so as to be shared by each port, it is possible to reduce the number of facilities required when the system is constructed.

In a case where the transfer rate of data sent from a terminal is high, the band assignment controller 25c sends the terminal an OAM cell for requesting an increase in band. When an affirmative response to the OAM cell is received from the network, the band assignment controller 25c increases the assigned band of the terminal by a prescribed amount and decreases an idle band by an amount equivalent to the increase in the assigned band. In a case where the transfer rate of data sent from a terminal is low, the band assignment controller 25c sends the terminal an OAM cell for requesting a decrease in band. When an affirmative response to the OAM cell is received from the network, the band assignment controller 25c decreases the assigned band of the terminal by a prescribed amount and increases an idle band by an amount equivalent to the increase in the assigned band. In this case, the data quantity monitoring unit 34 detects, at prescribed times, whether the transfer rate of the data sent from the terminal is greater than a first set value, counts the number of times the first set value is exceeded and outputs a band increase command to the band assignment controller 25c when the value of the count per set time is greater than a set number of times. Further, the data monitoring unit 34 detects, at prescribed times, whether the transfer rate of data sent from a terminal is less than a second set value and outputs a band decrease command to the band assignment controller 25c when the transfer rate is less than the second set value successively a number of times greater than a set number of times.

Thus, the transfer rate of data is detected and the assigned band is changed dynamically depending upon the value of the transfer rate. This makes it possible to utilize the band effectively while avoiding congestion of the network and providing the service quality (cell discard rate, delay) required by the user.

(B) First embodiment of the invention (a) Overall configuration

Figure 2:
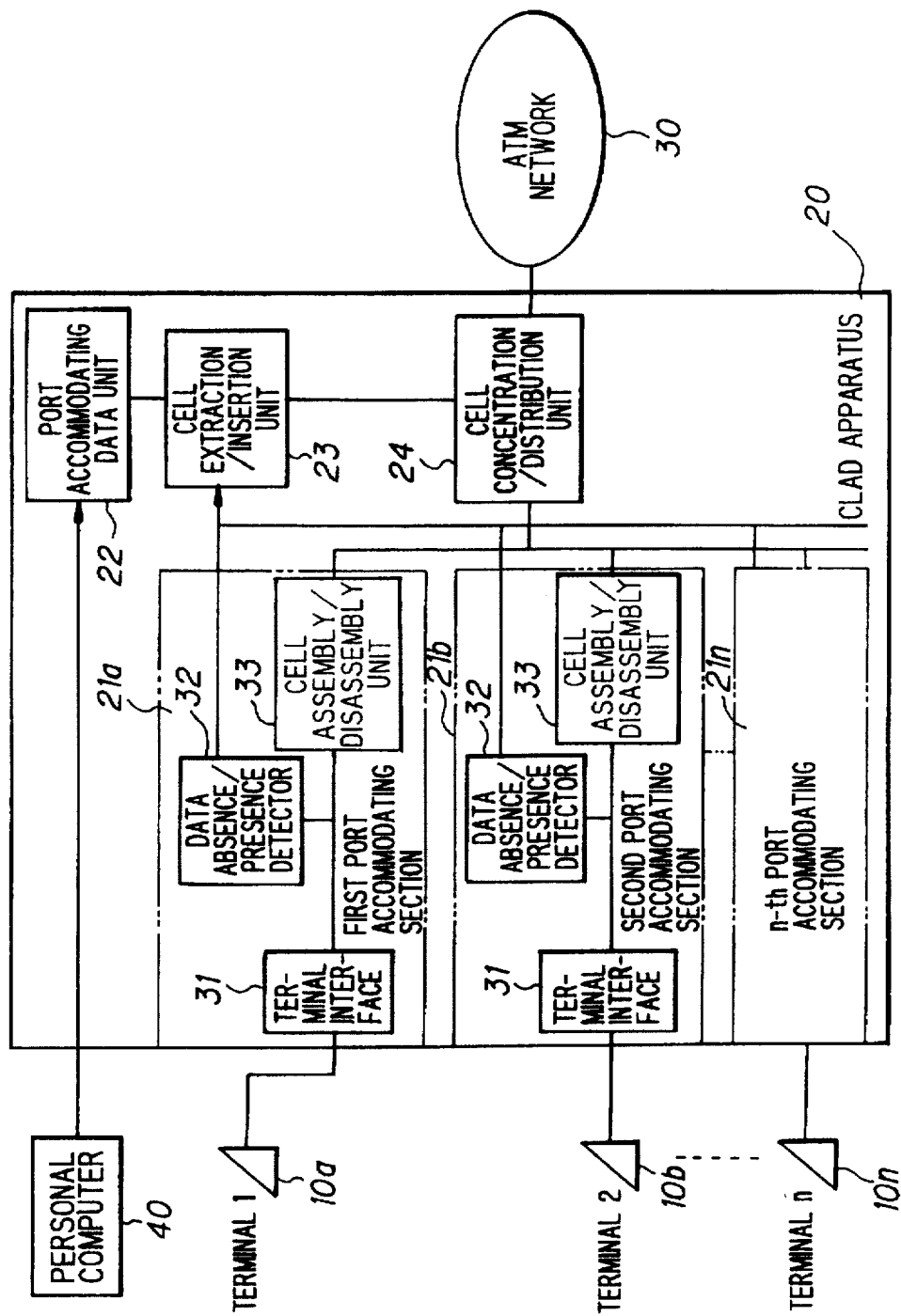
FIG. 2 is a block diagram showing the construction of an embodiment of the present invention.

FIG. 2 is a block diagram showing the construction of CLAD apparatus according to a first embodiment of the present invention. The arrangement of FIG. 2 can be applied to television telephone conference or the like.

The terminals 10a, 10b, ... 10n may be ATM terminals and existing interface terminals other than ATM terminals. Further, the terminals include SVC (switched virtual channel) service terminals and PVC (permanent virtual channel) service terminals. An SVC service is one in which a connection is made to a designated terminating terminal whenever necessary, i.e., when an outgoing call is made. A terminal capable of accommodating this service is referred to as an SVC service terminal. A PVC service is a service in which a terminal is decided in advance when a contract is made with a network provider. This service establishes a path to the terminal at all times. A terminal capable of accommodating this service is referred to as a PVC service terminal.

The CLAD apparatus 20 places the terminals in service in the ATM network and has the following functions: (1) a function for performing processing in which calls to the network are set up or released based upon the absence/ presence of valid data from an SVC service terminal; (2) a function for performing processing for band assignment/cancellation relative to the network based upon the absence/presence of valid data from a PVC service terminal; (3) a function for assembling data entering from each terminal into cells, concentrating (multiplexing) the cells and sending them to the ATM network 30; and (4) a function in which multiplexed cells entering from the ATM network 30 are separated according to destination, subsequently disassembled into data handled by the terminals and entered into the prescribed terminals. In addition to the well-known functions of an ATM network, the ATM network 30 has a function for assigning bands and releasing bands based upon the OAM cell sent from the CLAD apparatus 20. Numeral 40 denotes a personal computer which functions to set various data in the port accommodating data unit 22, described later, or to display the set data on a display unit.

The CLAD apparatus 20 includes the port accommodating units 21a, 21b, ... 21n to which respective ones of the terminals are connected; the port accommodating data unit 22 for storing, in correspondence with each port accommodating unit (port number), the band assigned to the terminal connected to the respective port accommodating unit and the type of this terminal (SVC service terminal or PVC service terminal); the call processor or cell extraction/insertion unit 23 which (1) performs call set-up and call release processing by sending and receiving signal cells (control cells) to and from the network 30 based upon the absence/presence of valid data from an SVC service terminal and (2) performs band assignment/cancellation processing by sending and receiving OAM cells to and from the network 30 based upon the absence/presence of valid data from the PVC service terminal; and the concentrating/distributing unit 24 for concentrating (multiplexing) the cells entering from each port corresponding unit, sending them to the ATM network 30, separating multiplexed cells, which enter from the ATM network 30, according to address and then entering the cells into a port accommodating unit.

The port accommodating units 21a–21n are identically constructed and each includes a terminal interface section 31 for sending and receiving data to and from the respective terminal in accordance with a UNI (user network interface); the data absence/presence detecting unit 32 for detecting absence/presence of data sent from the respective terminal; and the cell assembly and disassembly unit 33 for assembling data into a cell after establishment of connection by the call set-up processing, outputting the cell, disassembling a data cell from the network into data having a format handled by the terminal and sending the data to the terminal.

(b) Data absence/presence detecting unit

Figure 3:
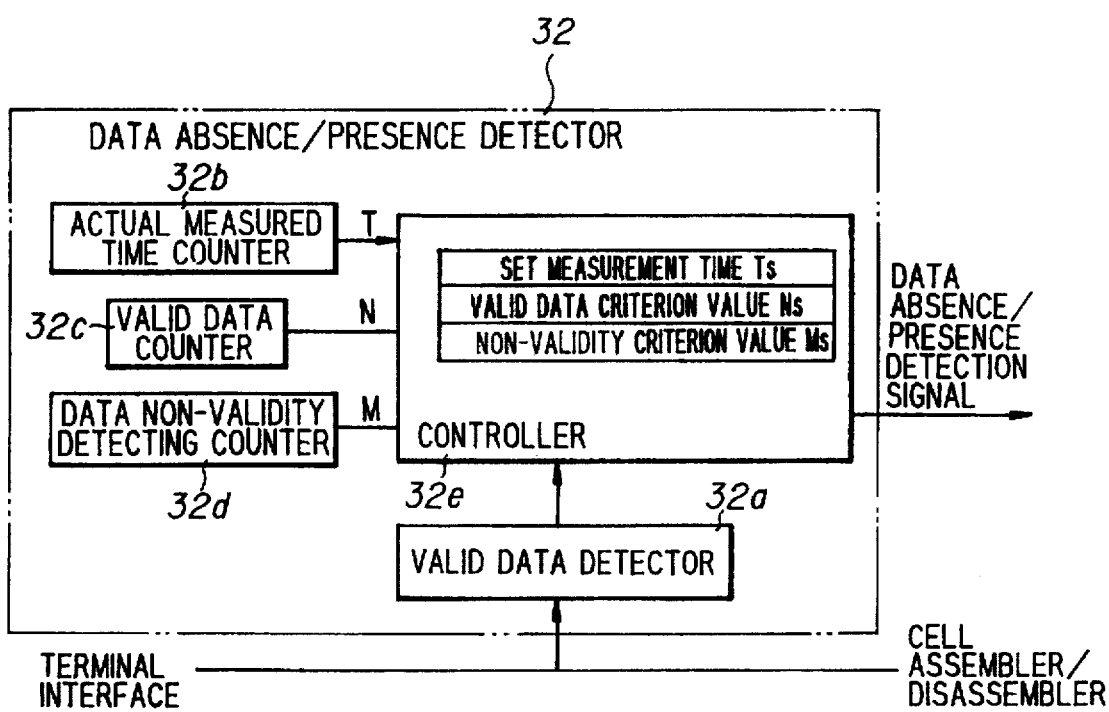
FIG. 3 is a block diagram showing the construction of a data absence/presence detecting unit.

FIG. 3 is a block diagram showing the construction of the data absence/presence detecting unit 32. The data absence/presence detecting unit 32 includes an effective data detecting unit 32a; an actual measurement-time counter 32b for counting actual measurement time T; a valid-data count counter 32c for counting the number N of times valid data is counted; a data non-validity detecting counter 32d for counting the number M of times valid data is not detected; and a controller 32e for performing control of data absence/presence detection. The controller 32e has an internal memory for storing a set measurement time Ts, a valid-data criterion value Ns and a non-validity criterion Ms, etc.

(b-1) Processing for detecting presence of data

Figure 4:
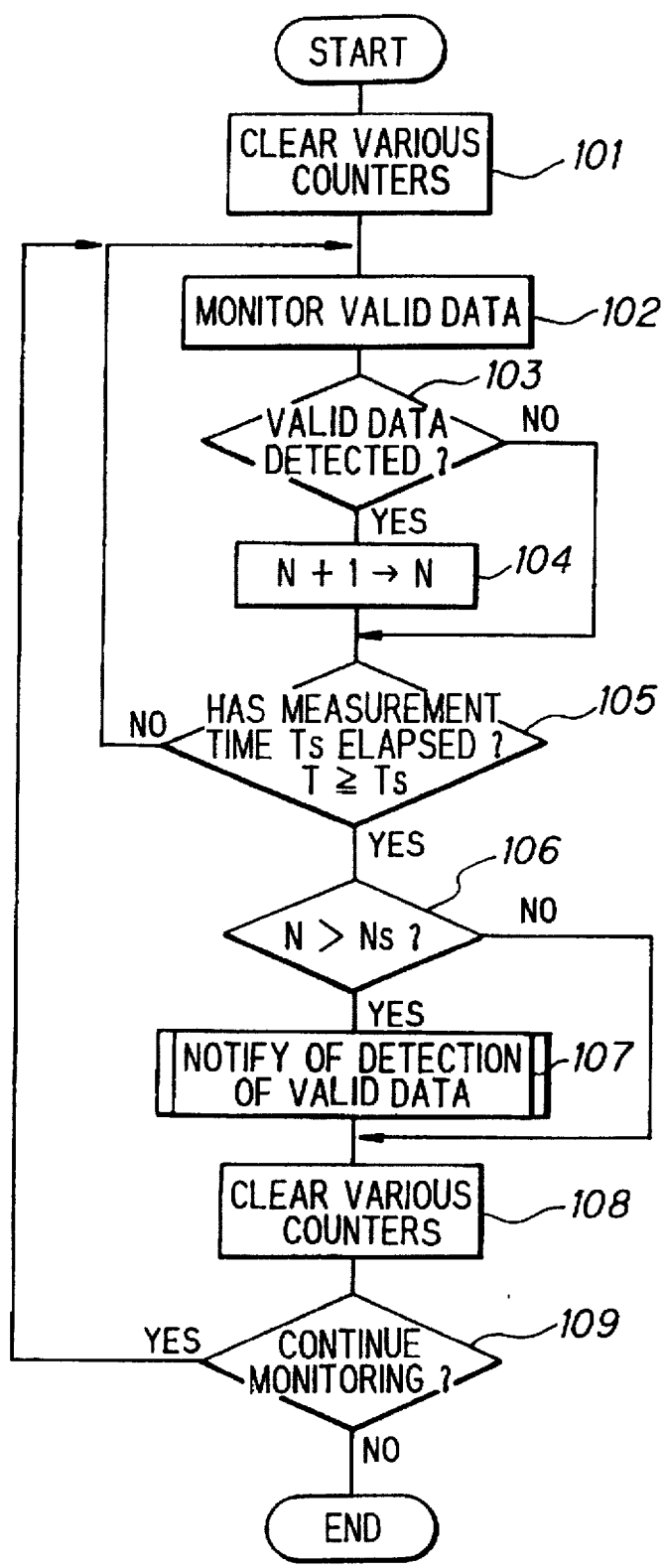
FIG. 4 is a flowchart of processing for detecting presence of data.

FIG. 4 is a flowchart of processing executed by the controller 32e to detect the presence of data.

Initially the counters 32b, 32c associated with processing for detecting the presence of data are cleared (step 101).

Monitoring is carried out at every prescribed unit of time $\Delta T$ to determine whether valid data is being sent from a terminal, and actual measurement time T is incremented by $\Delta T$ (steps 102, 103). If valid data is detected, the value of the count (number of times valid data is detected) N in the valid-data count counter 32c is counted up (N+1→N; step 104). As for the detection of valid data, a flag having a predetermined pattern is sent at the beginning of the data in case of flag synchronism, for example. Therefore, monitoring can be performed to determine whether there is data after the flag, thereby assuring that noise will not be detected erroneously as valid data.

After the counter 32c is incremented, or in a case where valid data is not detected, it is determined whether the actual measurement time T has exceeded the set measurement time Ts (step 105). If T is not greater than Ts, the processing from step 102 onward is repeated. If the actual measurement time T has exceeded the set measurement time Ts, then it is determined whether the count N of valid data detections is greater than the valid-data criterion value Ns (step 106). If $N \geq Ns$ holds, then detection of valid data is communicated to the cell extraction/insertion unit 23 (step 107). Next, the various counters are cleared (step 108). If continuation of monitoring is required, the program returns to step 102 and processing from this step onward is repeated. If continuation of monitoring is not required, then processing for detecting the presence of data is terminated (step 109).

To sum-up the foregoing, it is judged that data is present if valid data is detected a number of times greater than the valid-data criterion value Ns within the set measurement time. As a result of this arrangement, the presence of data can be judged correctly even in a case where data arrives in bursts. Moreover, erroneous operation due to noise can be eliminated.

(b-2) Processing for detecting absence of data

Figure 5:
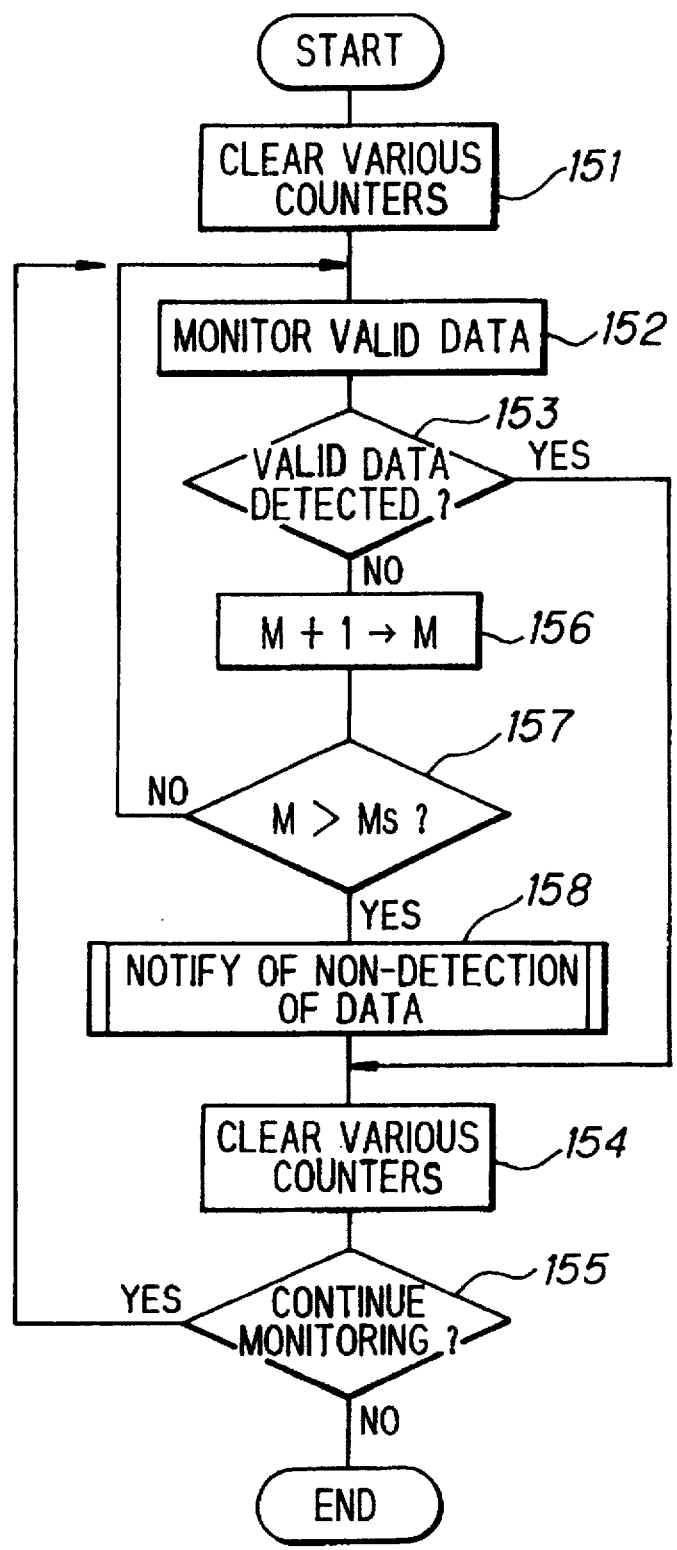
FIG. 5 is a flowchart of processing for detecting absence of data.

FIG. 5 is a flowchart of processing executed by the controller 32e to detect the absence of data.

Initially various counters 32d, etc., associated with processing for detecting the absence of data are cleared (step 151). Monitoring is carried out at every prescribed unit of time $\Delta T$ to determine whether valid data is being sent from a terminal (step 152). If valid data is detected (YES at step 153), the various counters 32d, etc., are cleared (step 154). If continuation of monitoring is required, the program returns to step 152 and processing from this step onward is repeated. If continuation of monitoring is not required, then processing for detecting the absence of data is terminated (step 155).

If valid data is not detected at step 153, the count M in the data non-validity detecting counter 32d is counted up (step 156) and then it is determined whether the count M is greater than the non-validity criterion value Ms (step 157). If M<Ms holds, then the program returns to step S152 and processing from this step onward is repeated. If $M \geq Ms$ holds, or, in other words, if non-detection of valid data continues for more than the non-validity criterion value Ms, then detection of the absence of data is communicated to the cell extraction/insertion unit 23 (step 158). Processing from step 154 onward is then executed.

To sum up the foregoing, it is judged that data is absent if valid data fails to be detected successively for more than the non-validity criterion value Ms. As a result of this arrangement, the absence of data can be detected with assurance.

(c) Port accommodating data unit

The port accommodating data unit 22 stores, in correspondence with each port accommodating unit (port number) 21a–21n, the bands assigned to the terminals 10a–10n connected to the respective port accommodating units and the types of these terminals. FIG. 6 is a diagram for describing the constitution of the port accommodating data unit 22. The unit 22 stores the following in correspondence with each port number: (1) a band 22a assigned to the terminal; (2) the type (SVC or PVC) 22b of the terminal; (3) an indication 22c to the effect that the terminal is in use; (4) terminal number 22d; (5) terminating terminal number 22e; (6) signal VCI (given when a contract is made) added onto the cell header at the time of call set-up; and (7) terminal attributes 22g. These items of data are set in the port accommodating data unit 22 from the personal computer 40.

In order for a terminal to communicate with the terminal of another party, the number of the other party is set in the port accommodating data unit 22 from the personal computer 40, after which power is introduced to the sending terminal and the data is transmitted. An arrangement may also be adopted in which the number of the other party's terminal is set from each terminal without using a personal computer.

(d) Cell extraction/insertion unit

Figure 7:
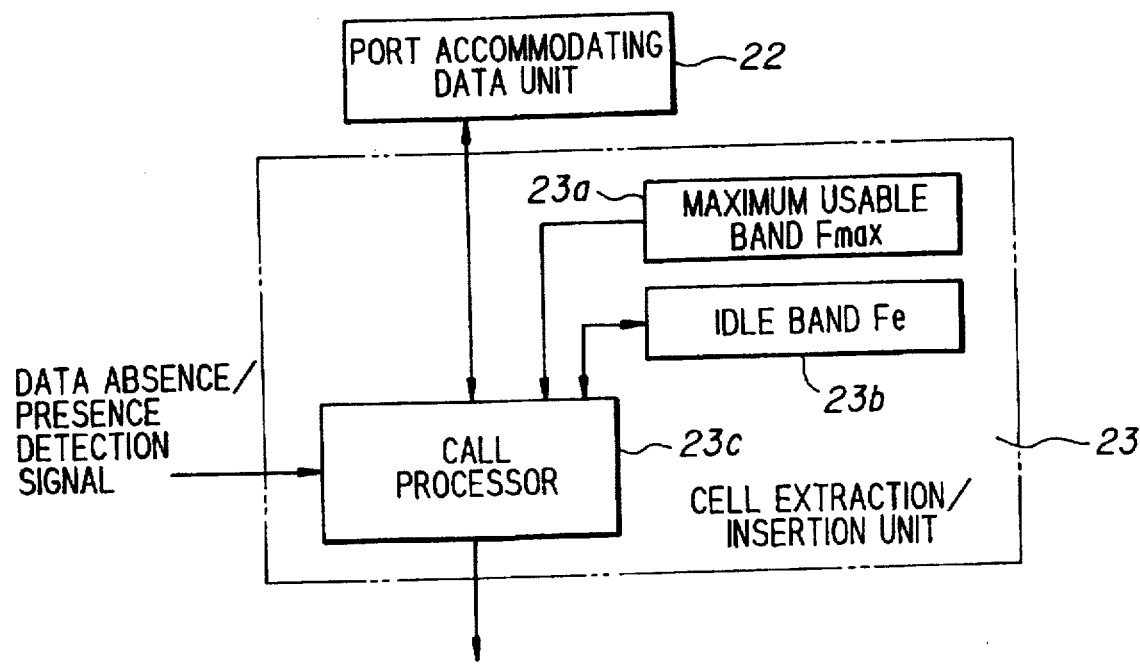
FIG. 7 is a block diagram showing the construction of a cell extracting/inserting unit according to a first embodiment of the invention.

FIG. 7 is a block diagram showing the construction of the cell extraction/insertion unit 23. The latter includes a register 23a for storing a maximum usable band Fmax of the transmission line; a register 23b for storing an idle band Fe; and the call processor 23c for executing call set-up processing and call release processing. When the presence of data has been communicated to it by the data absence/presence detecting unit 32, the call processor 23c executes call set-up processing. When it has been informed of absence of data by the data absence/presence detecting unit 32, the call processor 23c executes call release processing.

(d-1) Call set-up processing

Figure 8:
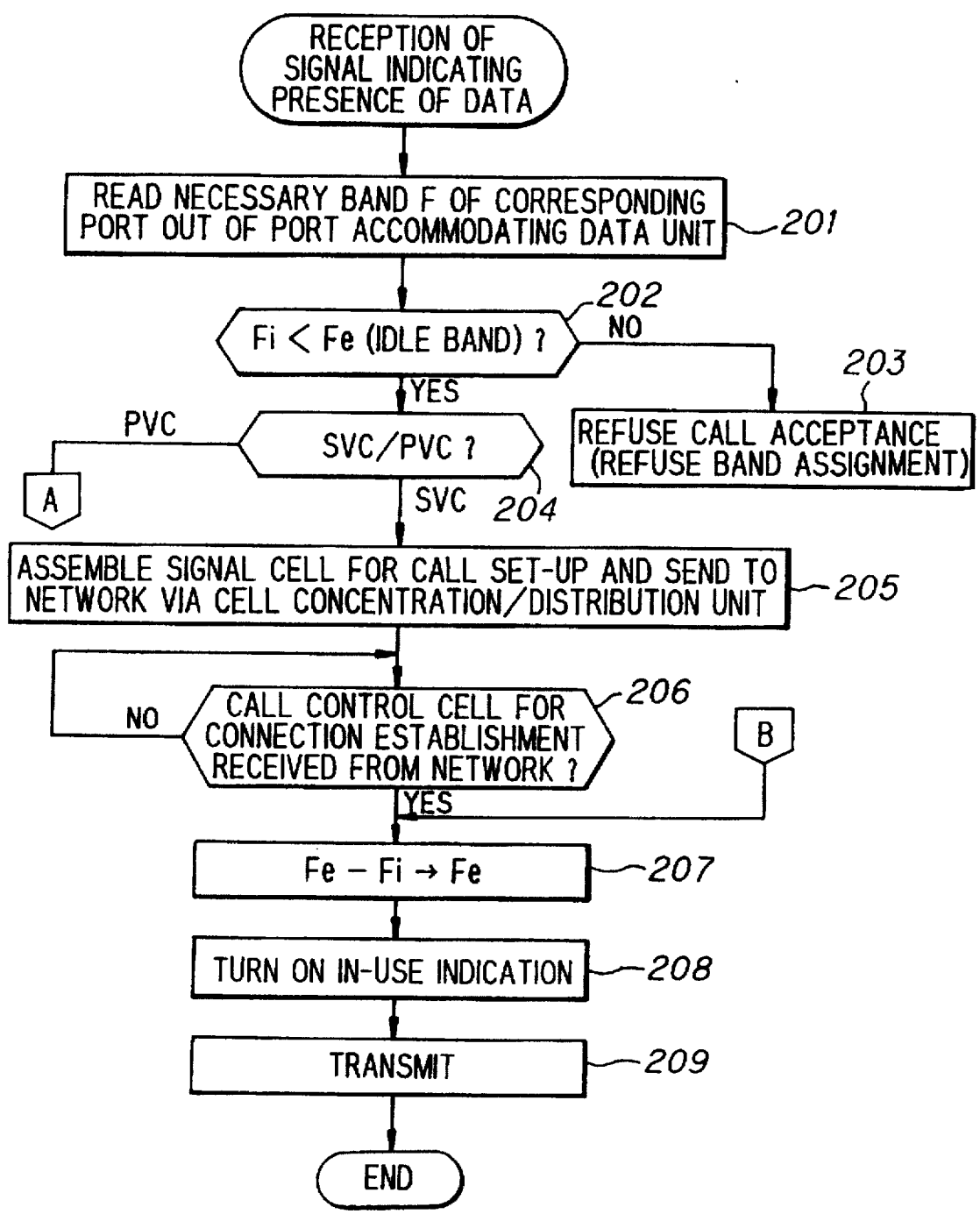
FIG. 8 is a flowchart of processing for call set-up in a call processing unit.
Figure 9:
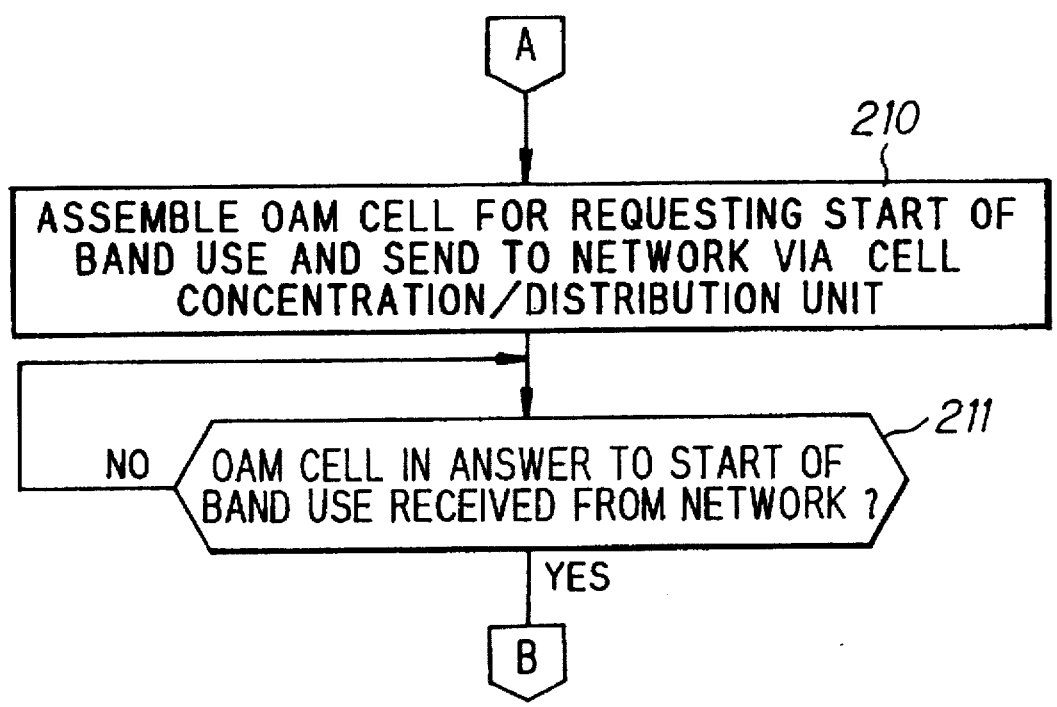
FIG. 9 is a flowchart of processing for call set-up in the call processing unit.

FIGS. 8 and 9 are flowcharts of processing for call set-up executed by the call processor 23c.

When informed by the data absence/presence detecting unit 32 of the fact that data is present, the call processor 23c goes to the port accommodating data unit 22 to read out various data (assigned band Fi, type of terminal, etc.) of the terminal to which the data absence/presence detecting unit 32 is connected (step 201). Next, the call processor 23c compares the magnitudes of the assigned band Fi and idle band Fe (step 202). If Fi≧Fe holds, call acceptance (band assignment) is refused (step 203). If Fi<Fe holds, the call processor 23c determines whether the terminal is an SVC service terminal or a PVC service terminal (step 204).

In a case where the terminal is an SVC service terminal, the call processor assembles a call set-up message (originating terminal number, terminating terminal number, required band and other attributes) into a cell, adds a signal VCI to the header and transmits the result to the ATM network 30 via the cell concentration/distribution unit 24 (step 205). The call processor then waits for reception of the control cell for connection establishment from the network (step 206). If the control cell is received, the call processor reduces the idle band Fe through the operation Fe–Fi→Fe (step 207). Next, the in-use display corresponding to the originating terminal of the port accommodating data unit 22 is turned on (step 208) and the cell concentration/distribution unit 24 is instructed to start communication (step 209). As a result, the cell concentration/distribution unit 24 concentrates cells from the originating terminal and sends them to the ATM network 30.

If the originating terminal is found to be a PVC service terminal at step 204, then the call processor 23c assembles an OAM cell requesting that the band that has been assigned to this PVC terminal be used and sends the OAM cell to the ATM network 30 via the cell concentration/distribution unit 24 (step 210). The call processor then waits for reception of an OAM cell, which is an answer to the start of band use, from the network (step 211). If this OAM cell is received, the call processor executes the processing from step 207 onward.

(d-2) Call release processing

Figure 10:
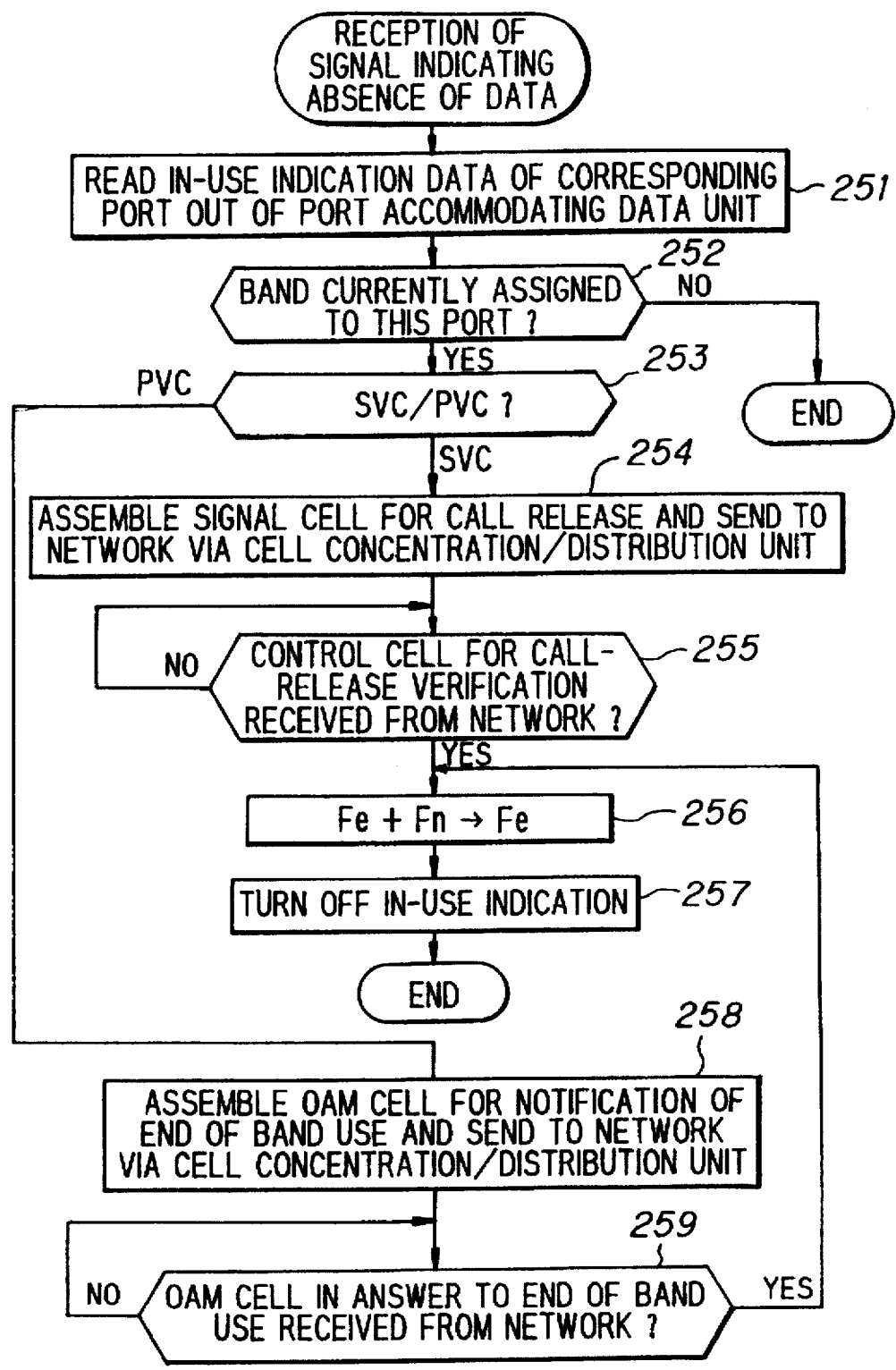
FIG. 10 is a flowchart of call-release processing in the call processing unit.

FIG. 10 is a flowchart of processing for call release executed by the call processor 23c.

When informed by the data absence/presence detecting unit 32 of the fact that data is absent, the call processor 23c goes to the port accommodating data unit 22 to read out various data (assigned band Fi, type of terminal, in-use indication, etc.) of the terminal to which the data absence/presence detecting unit 32 is connected (step 251). Next, the call processor 23c refers to the in-use indication to determine whether the terminal is currently in use (is being assigned a band) (step 252). If the terminal is not in use, processing is terminated.

If the terminal is in use, however, the call processor checks to see whether the terminal is an SVC service terminal or a PVC service terminal (step 253). In a case where the terminal is an SVC service terminal, the call processor assembles a call release message into a cell, adds a signal VCI to the header and transmits the result to the ATM network 30 via the cell concentration/distribution unit 24 (step 254). The call processor then waits for reception of a control cell from the network for the purpose of verifying call release (step 255). If the control cell is received, the call processor increases the idle band Fe through the operation Fe+Fi→Fe (step 256), turns off the in-use indication in the port accommodating data unit 22 and instructs the cell concentration/distribution unit 24 to halt communication (step 257). As a result, the cell concentration/distribution unit 24 halts the concentration of cells from the terminal.

If the originating terminal is found to be a PVC service terminal at step 253, then the call processor 23c assembles an OAM cell requesting termination of use of the band that has been assigned to this PVC terminal and sends the OAM cell to the ATM network 30 via the cell concentration/distribution unit 24 (step 258). The call processor then waits for reception of an OAM cell, which is an answer to the end of band use, from the network (step 259). If this OAM cell is received, the call processor executes the processing from step 256 onward.

(e) OAM cell

FIGS. 11A, 11B show formats of OAM cells defined by advisory, in FIG. 11A is an F4 format and FIG. 11B an F5 format.

OAM is an overall function for performing fault management and performance management. This can be subdivided into (1) a performance monitoring function, (2) a defect and fault detection function, (3) a system protection function, (4) a fault information or performance report information transfer function, and (5) a fault-location specifying function. These functions are communicated by the OAM cell. In the ATM layer, establishing a bidirectional (outgoing and incoming) OAM flow with respect to one connection is useful. For example, by providing a mechanism in which information indicating a fault or decline in performance which has occurred downstream of a certain connection point is sent back, by the receiving terminating point on the downstream side, to the opposing terminating point on the upstream side, the bidirectional OAM information will physically traverse the same path. Therefore, bidirectional supervision of connection fault and performance information can be carried out by performing monitoring at any point whatsoever. The F4 and F5 OAM cells are both composed of a five-octet ATM cell header and a 48-octet ATM cell payload. The ATM cell payload is composed of four-bit OAM cell type, four-bit function type, a 45-octet function specific field, an 8-bit reserve field and a 10-bit ECC.

The F4 OAM flow (FIG. 11A) is based upon a bidirectional (outgoing and incoming) setting with respect to all VP connections. Since the OAM flow in this F4 OAM flow traverses a path the same as that of a user information cell which flows through the VP connections, the OAM cell has (1) a VPI number the same as that of the user cell, and (2) specific VCI values (VCI=3, VCI=4) so that the cell will be identified as an OAM cell. VCI=3 identifies the cell as being a segment OAM cell, and VCI=4 identifies the cell as an end-to-end OAM cell.

The F5 OAM flow (FIG. 11B) is based upon a bidirectional (outgoing and incoming) setting with respect to all VC connections. Since the OAM flow in this F5 OAM flow traverses a path the same as that of a user information cell which flows through the VC connections, the OAM cell has (1) a VPI value and a VCI value the same as those of the user cell, and (2) specific payload identifiers (PT=100, PT=101) so that the cell will be identified as an OAM cell. PTI=100 identifies the cell as being a segment OAM cell, and PTI=101 identifies the cell as an end-to-end OAM cell.

FIG. 12 is a correspondence table of OAM cell type vs. function type. The advised OAM cell types are fault management type 0001, performance management type 0010 and activation/deactivation management type 1000. The fault management type 0001 includes (1) an alarm indication signal (AIS), which is a warning of fault detection, (2) far-end-receive failure (FERF), (3) continuity check and (4) loopback. The performance management type 0010 includes (1) forward monitoring, (2) backward monitoring and, (3) monitoring and reporting. The activation/deactivation management type includes (1) performance monitoring and (2) continuity check.

Figure 13:
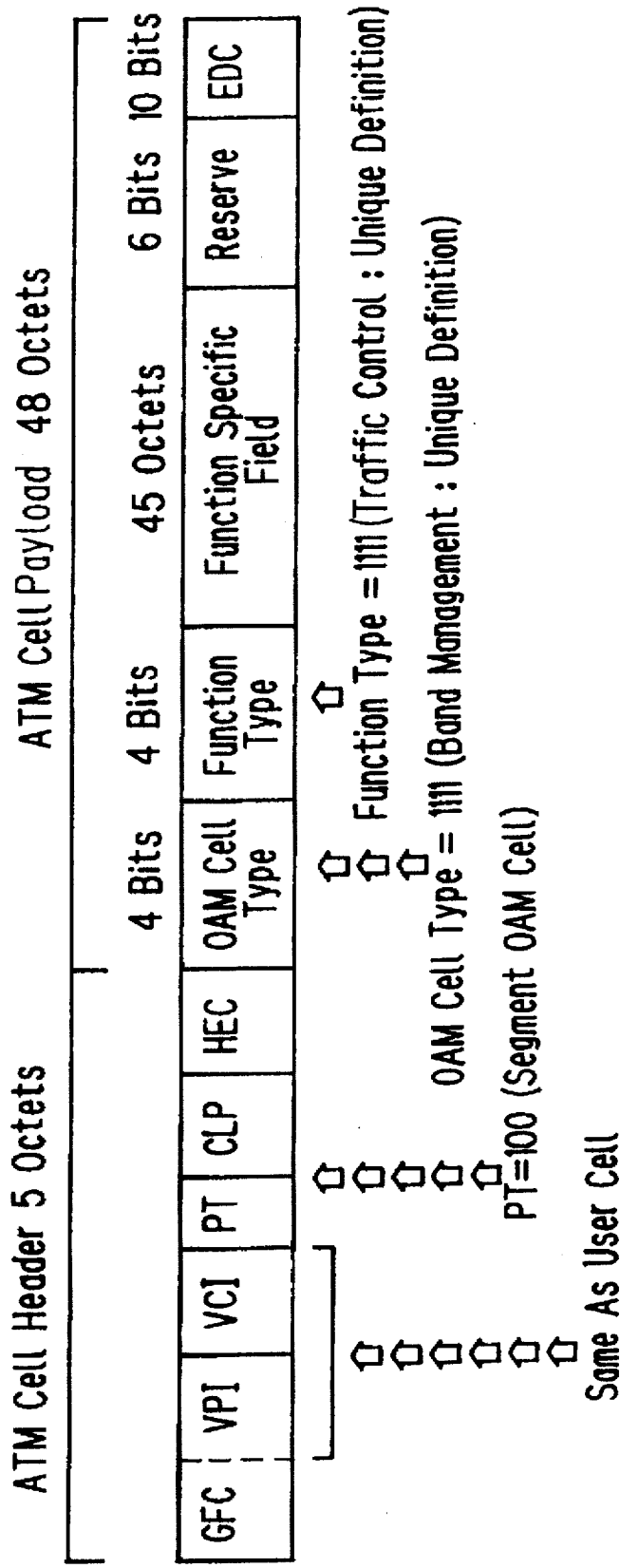
FIG. 13 is a diagram for describing the format of an OAM cell for band management.

Thus, since OAM cell type is expressed by four bits, 15 types can be set. However, the advised OAM cell types are three only. Accordingly, in the present invention, an OAM cell type 1111 for band management is defined independently in the segment OAM cell (PT=100) of the F5 OAM cell, as shown in FIG. 13, and traffic control is defined as the function type.

FIGS. 14A–14C are diagrams for describing examples of definitions of such OAM cells for band management, and FIG. 15 is a table for describing function specific fields of the OAM cells for band management. OAM cells for band management are of three types, as illustrated in FIGS. 14A–14C. The first type (FIG. 14A) has a one-octet function ID and a 44-octet reserve field. This OAM cell is used when requesting start of band use and when giving notification of end of band use. The second type (FIG. 14B) has a one-octet function ID, a one-octet ACK ID indicating an affirmative/negative answer and a 43-octet reserve field used when answering with start of band use, end of band use, increase of assigned band and decrease of assigned band. The third type (FIG. 14C) has a one-octet function ID, a three-octet forward peak cell rate (CLP=0), a three-octet backward peak cell rate (CLP=1) and a 32-octet reserve field. This OAM cell is used when requesting an increase in band assignment and a decrease in band assignment. Further, CLP is the abbreviation of cell loss priority.

(f) Overall operation of CLAD apparatus

Figure 16:
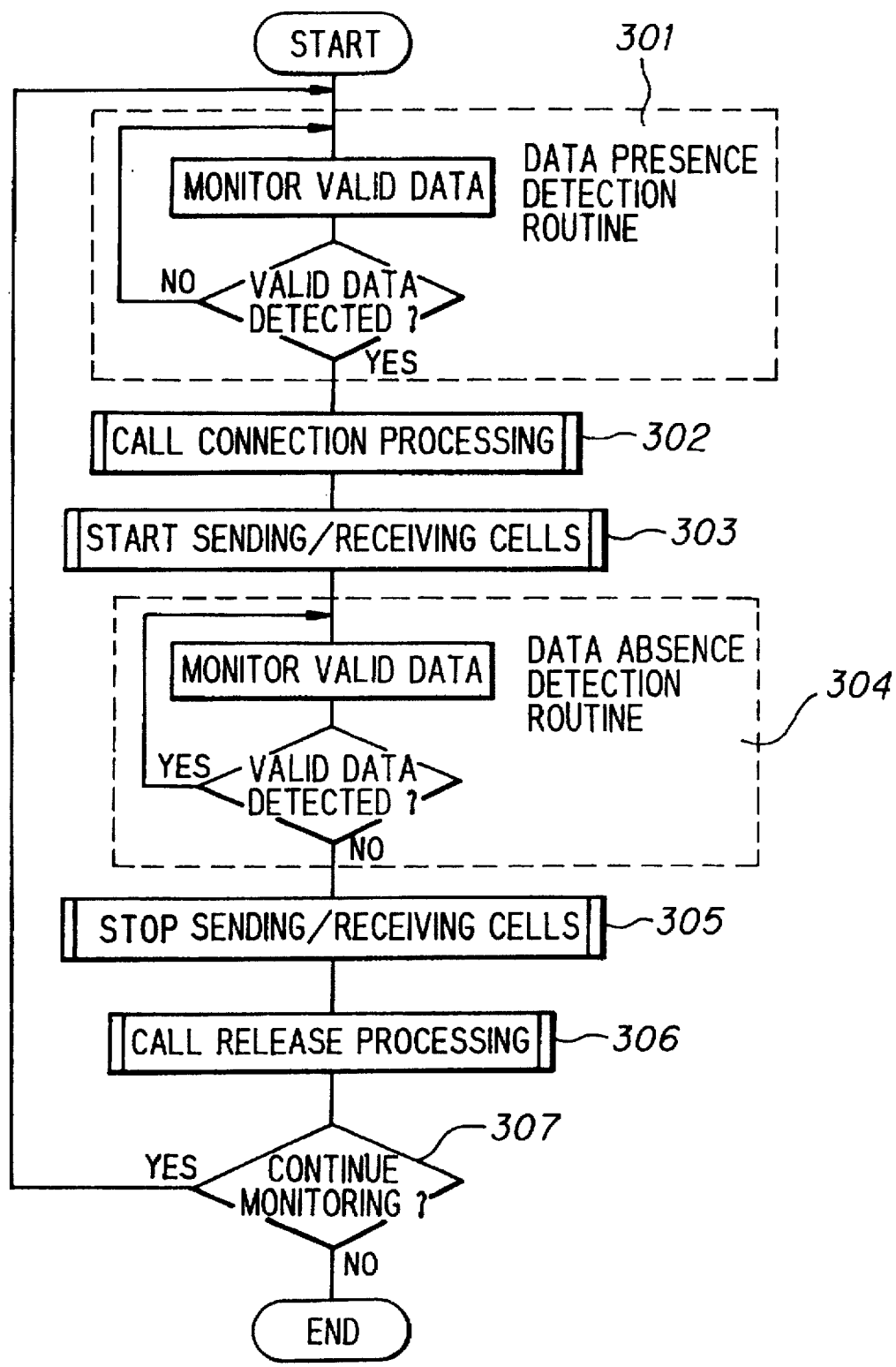
FIG. 16 is a flowchart of overall processing for call set-up and call release based upon absence/presence of data.

FIG. 16 is a flowchart of processing for call set-up and call release based upon absence/presence of data.

Each data absence/presence detecting unit 32 in the CLAD apparatus 20 executes processing (step 301) for detecting the presence of valid data in accordance with the flowchart of FIG. 4. If the presence of valid data is detected, the data absence/presence detecting unit 32 enters a data-present signal into the cell extraction/insertion unit 23. In response, the cell extraction/insertion unit 23 executes call set-up processing (step 302) in accordance with the flowcharts of FIGS. 8 and 9. When a connection between the originating terminal and terminating terminal is established as a result of call set-up, the sending and receiving of cells between the two terminals commences (step 303).

During the course of data communication, the data absence/presence detecting unit 32 executes processing (step 304) for detecting the absence of valid data in accordance with the flowchart of FIG. 5. If absence of effective data is detected, the data absence/presence detecting unit 32 enters a data-absence signal into the cell extraction/insertion unit 23. In response, the cell extraction/insertion unit 23 halts the sending and receiving of cells (step 305) and executes call release processing (step 306) in accordance with the flowchart of FIG. 10. The cell extraction/insertion unit 23 thenceforth checks to see whether monitoring is capable of continuing (step 307). If continuation is necessary, the program returns to step 301 and processing from this step onward is executed. If continuation is unnecessary, call set-up/release processing is terminated.

Thus, call set-up and call release are carried out depending upon whether valid data is present or absent. Therefore, in a case where data is not being sent from a terminal, the band that has been assigned to the terminal is released and can be assigned to another terminal. This makes it possible to utilize the band effectively. Further, regardless of whether a terminal is an SVC service terminal or PVC service terminal, the band that has been assigned to this terminal in advance is allowed to be used in response to the presence of data and the band is caused to be released in response to the absence of data. This makes it possible to utilize the band effectively.

(C) Second embodiment of the invention (a) Overall configuration

Figure 17:
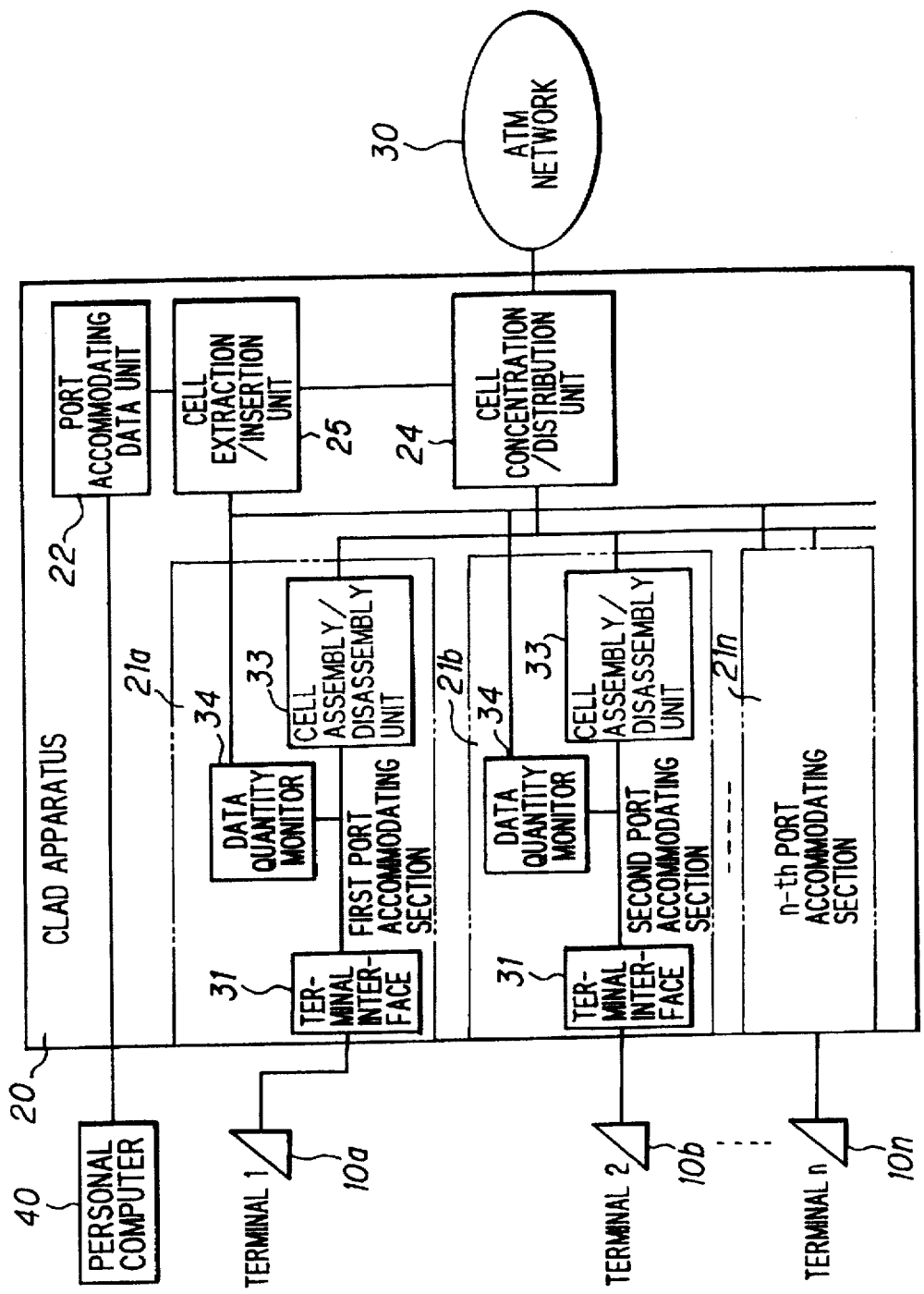
FIG. 17 is a block diagram showing a second embodiment of the present invention.

FIG. 17 is a block diagram showing the construction of CLAD apparatus according to a second embodiment of the present invention. Components in FIG. 17 identical with those of the first embodiment shown in FIG. 2 are designated by like reference characters.

Numerals 10a, 10b, . . . 10n denote the terminals and numeral 20 represents the CLAD apparatus which places the terminals in service in the ATM network. The CLAD apparatus 20 has the following functions: (1) a function which, on the basis of the quantity (transfer rate) of data from a terminal, is for sending the network an OAM cell for increasing the assigned band or an OEM cell for decreasing the assigned band, thereby controlling increase and decrease of the assigned band; (2) a function for assembling data entering from each terminal into cells, concentrating (multiplexing) the cells and sending them to the ATM network 30; and (3) a function in which multiplexed cells entering from the ATM network 30 are separated according to destination, subsequently disassembled into data handled by the terminals and entered into the prescribed terminals. In addition to the well-known functions of an ATM network, the ATM network 30 has a function for increasing and decreasing assigned band based upon the OAM cell sent from the CLAD apparatus 20. Numeral 40 denotes the personal computer which sets various data in the port accommodating data unit 22 or displays the set data on a display unit.

The CLAD apparatus 20 includes the port accommodating units 21a, 21b, ... 21n to which respective ones of the terminals 10a–10n are connected; the port accommodating data unit 22 (see FIG. 6) for storing, in correspondence with respective port accommodating units (port numbers) 21a–21n, the bands assigned to the terminals 10a–10n connected to the respective port accommodating units; a cell extraction/insertion unit 25 for controlling increase/decrease of assigned band by sending and receiving OAM cells to and from the network 30 based upon the magnitude of the transfer rate of data from the terminal; and the concentrating/distributing unit 24 for concentrating (multiplexing) the cells entering from each of the port corresponding units 21a–21n, sending them to the ATM network 30, separating multiplexed cells, which enter from the ATM network 30, according to address and then entering the cells into the port accommodating units 21a–21n.

The port accommodating units 21a–21n are identically constructed and each includes the terminal interface section 31 for sending and receiving data to and from the respective terminal in accordance with a UNI; a data quantity monitor 34 for detecting the magnitude of the transfer rate of data sent from each terminal; and the cell assembly and disassembly unit 33 for assembling data, which has entered from a terminal, into a cell after establishment of connection by the call set-up processing, outputting the cell, disassembling a data cell from the network into data having a format handled by the terminal and sending the data to the terminal.

(b) Data quantity monitor

Figure 18:
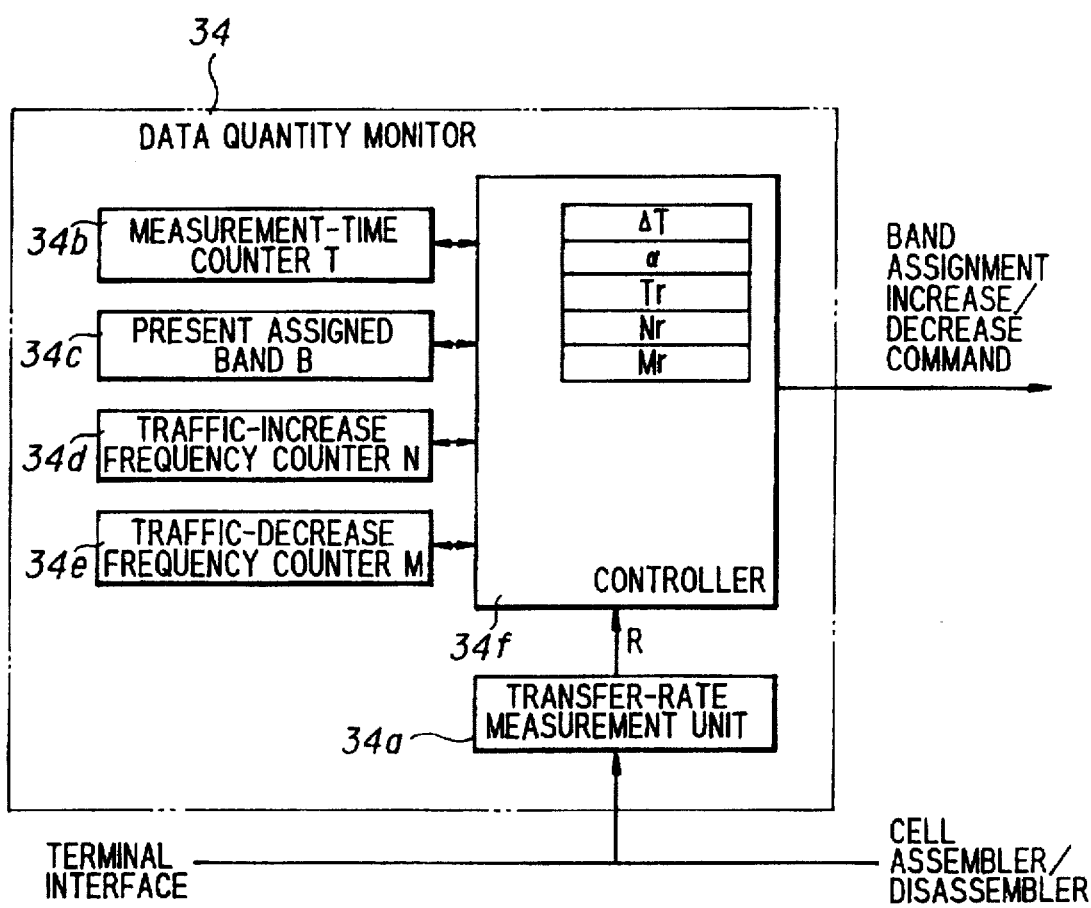
FIG. 18 is a block diagram showing the construction of a data quantity monitor.

FIG. 18 is a block diagram showing the construction of the data quantity monitor 34. The monitor 34 includes a transfer-rate measurement unit 34a for detecting data transfer rate (traffic) from a terminal at prescribed time intervals $\Delta T$; a measurement-time counter 34b for counting measurement time T; a register 34c for storing a band (presently assigned band) B assigned to the terminal; a traffic-increase counter 34d for counting the number N of times the transfer rate has surpassed a first set value ($=B-\alpha$); a traffic-decrease counter 34e for counting the number M of times the transfer rate has fallen below a second set value ($=B-2\alpha$); and a controller 34f for controlling detection of traffic magnitude. The controller 34f has an internal memory for storing the measurement time interval $\Delta T$, $\alpha$, a set measurement time Tr, a band-assignment increase reference value Nr and a band-assignment decrease reference value Mr.

(b-1) Processing for deciding upon assigned-band increase

Figure 19:
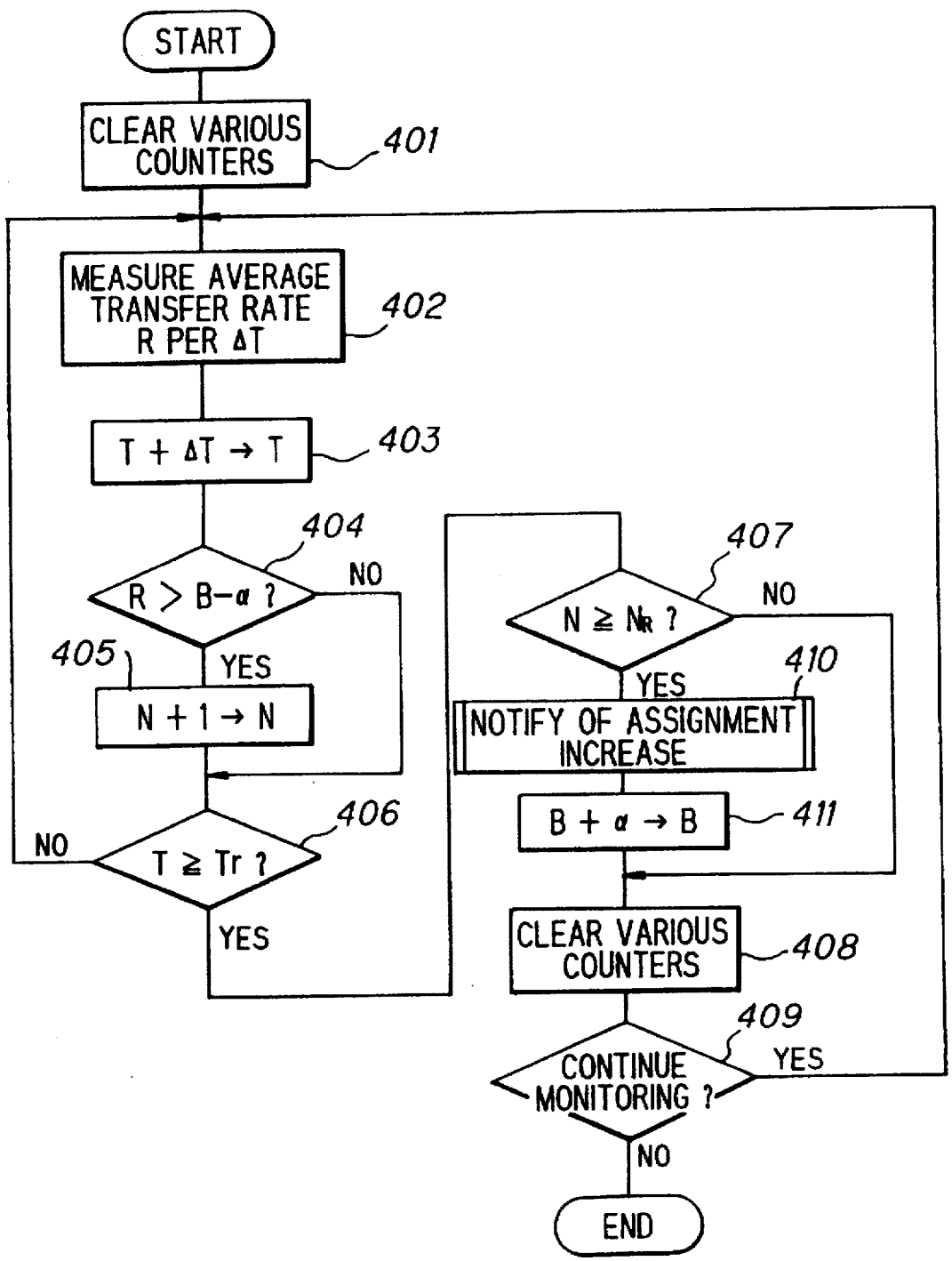
FIG. 19 is a flowchart of processing for deciding upon an increase in an assigned band.

FIG. 19 is a flowchart of processing for deciding upon an increase in an assigned band.

Initially the counters 34b, 34d associated with processing for deciding upon an increase in an assigned band are cleared (step 401). It should be noted here that the initial value of the presently allocated band B is the band Fi that has been stored in the port accommodating data unit 22.

Next, average transfer rate R per the prescribed unit time $\Delta T$ is measured and the actual measurement time T is incremented by $\Delta T$ (steps 402, 403). If the transfer rate R can be measured, then the transfer rate R and the first transfer set rate ($=B-\alpha$) are compared in terms of magnitude (step 404). Here $B-\alpha$ is adopted in the comparison in order to prevent the occurrence of cell loss as a result of the band being exceeded. If the result of the comparison is $R>B-\alpha$, then the count N is incremented (step 405). Thereafter, or if $R \leq B-\alpha$ is found to hold at step 404, it is determined whether the actual measurement time T has exceeded the set measurement time Tr (step 406). If the set measurement time Tr has not been exceeded, the processing from step 402 onward is repeated.

However, if the actual measurement time T is greater than the set measurement time Tr, it is determined whether the count N of the number of times the first set transfer rate ($B-\alpha$) has been exceeded is greater than the assigned-band increase reference value Nr (step 407). If N<Nr holds, the various counters 34b, 34d, etc., are cleared (step 408). If continuation of monitoring is required, the program returns to step 402 and processing from this step onward is repeated. If continuation of monitoring is not required, processing for deciding upon an increase in assigned band is terminated (step 409).

If $N \geq Nr$ is found to hold at step 407, then the controller 34f instructs the cell extraction/insertion unit 25 to increase the assigned band (step 410). As a result, the band-assignment controller of the cell extraction/insertion unit 25 executes processing for increasing the band by $\alpha$, as will be described later. The controller 34f increases the presently assigned band B by $\alpha$ ($B+\alpha \rightarrow B$; step 411) and then executes processing from step 408 onward.

To sum up the foregoing, if the count N of the number of times the first set transfer rate ($=B-\alpha$) has been exceeded within the set measurement time is greater than Nr, then it is judged that the amount of traffic is large and a command to increase the assigned band is issued.

(b-2) Processing for deciding upon assigned-band decrease

Figure 20:
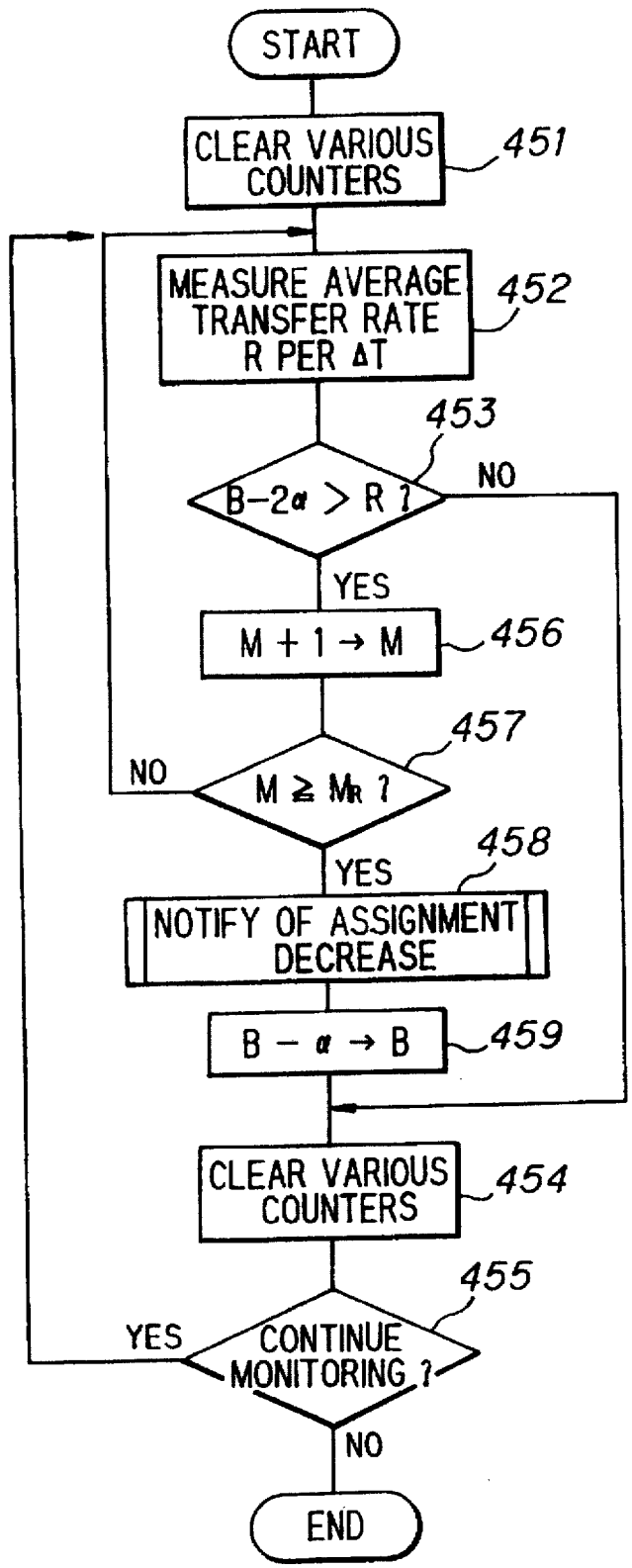
FIG. 20 is a flowchart of processing for deciding upon a decrease in an assigned band.

FIG. 20 is a flowchart of processing for deciding upon a decrease in an assigned band.

Initially the various counters 34e, etc., associated with processing for deciding upon a decrease in an assigned band are cleared (step 451). Next, average transfer rate R per unit time $\Delta T$ is measured (step 452). If the transfer rate R can be measured, then the transfer rate R and the second set transfer rate ($=B-2\alpha$) are compared in terms of magnitude (step 453). If the result of the comparison is $B-2\alpha \leq R$, then the various counters 34e, etc., are cleared (step 453). If continuation of monitoring is required, the program returns to step 452 and processing from this step onward is repeated. If continuation of monitoring is not required, processing for deciding upon a decrease in assigned band is terminated (step 455).

If the result of the comparison at step 453 is $B-2\alpha$, on the other hand, the count M is incremented (step 456). Next, it is determined whether the count M is greater than the band-assignment decrease reference value Mr (step 457). If M<Mr is found to hold, then the program returns to step 452 and processing from this step onward is repeated.

If $M \geq Mr$ is found to hold at step 457, then the controller 34f instructs the cell extraction/insertion unit 25 to decrease the assigned band (step 458). As a result, the band-assignment controller of the cell extraction/insertion unit 25 executes processing for decreasing the band by $\alpha$, as will be described later. The controller 34f then decreases the presently assigned band B by $\alpha$ ($B-\alpha \rightarrow B$; step 459) and then executes processing from step 454 onward.

To sum up the foregoing, if the transfer rate is less than the second set transfer rate ($B-2\alpha$) more than Mr times in succession, then it is judged that the amount of traffic is small and a command to decrease the assigned band is issued.

(c) Cell extraction/insertion unit

Figure 21:
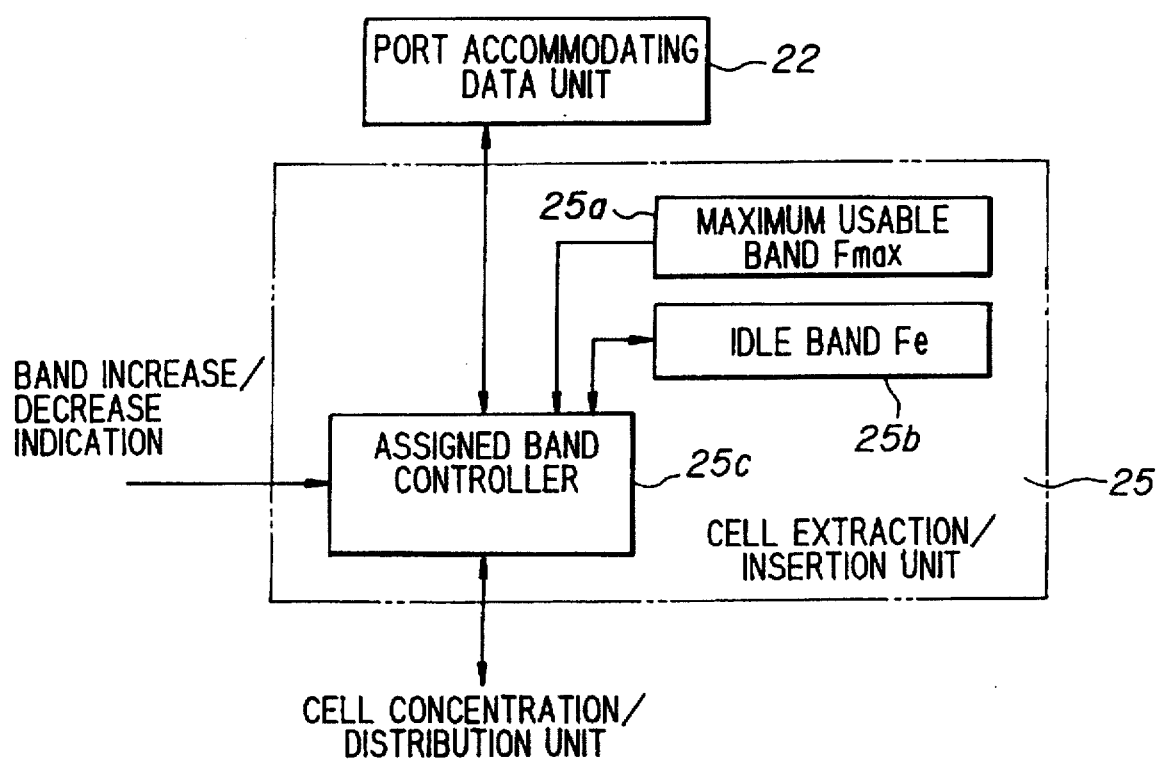
FIG. 21 is a block diagram showing the construction of a cell extracting/inserting unit according to a first embodiment of the invention.

FIG. 21 is a block diagram showing the construction of the cell extraction/insertion unit 25. The latter includes a register 25a for storing a maximum usable band Fmax of the transmission line; a register 25b for storing the idle band Fe; and the band assignment controller 25c for controlling the increase/decrease in the assigned band. The band assignment controller 25c performs control for increasing the assigned band when a band increase is instructed by the data quantity monitor 34 and performs control for decreasing the assigned band when a band decrease is instructed by the data quantity monitor 34.

(c-1) Control for increasing assigned band

Figure 22:
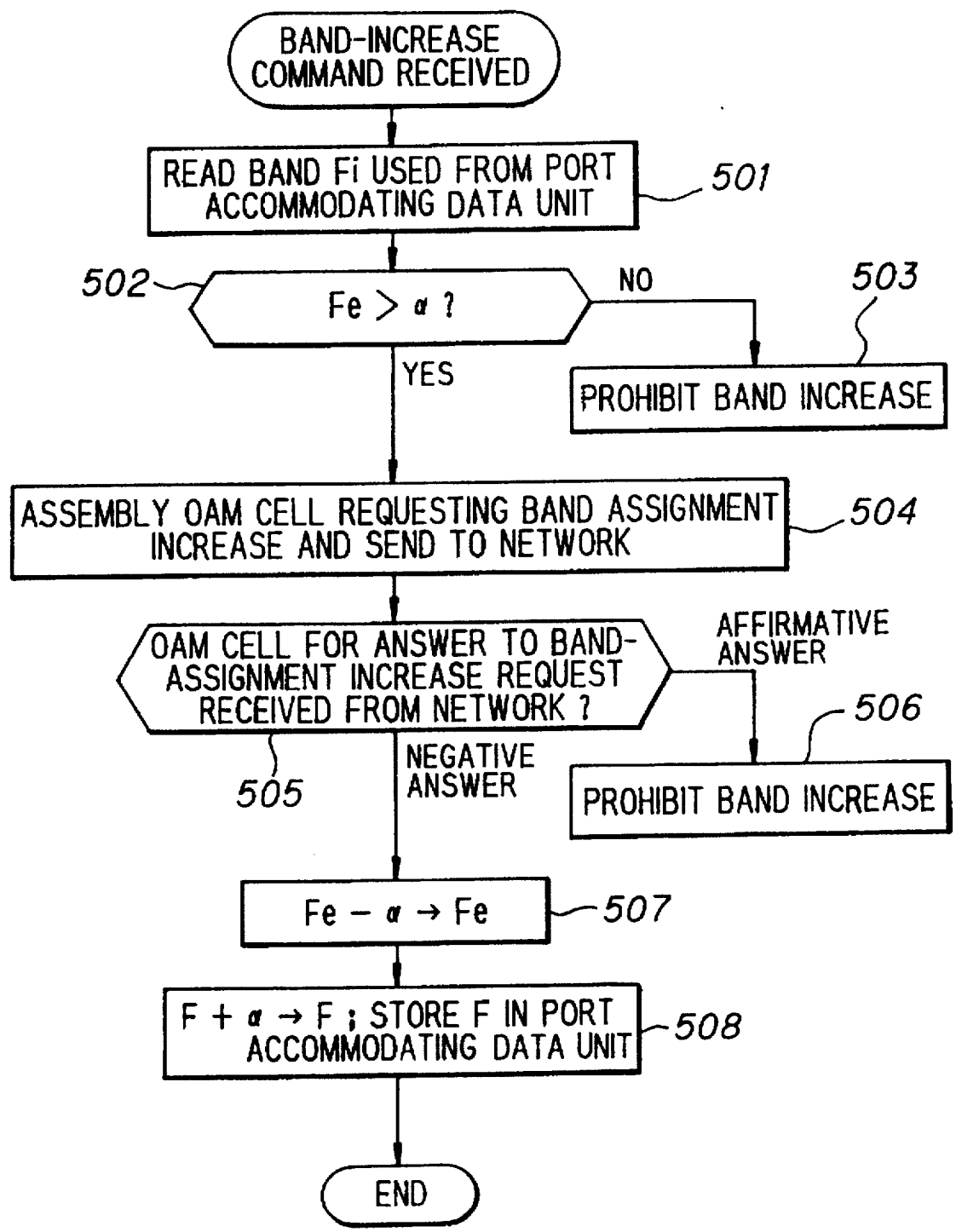
FIG. 22 is a flowchart of processing for increasing an assigned band.

FIG. 22 is a flowchart of processing executed by the band-assignment controller 25c to control an increase in the assigned band.

When an increase in band is instructed by the data quantity monitor 34, the band assignment controller 25c goes to the port accommodating data unit 22 to read out various data (assigned band Fi, type of terminal, in-use flag, etc.) of the terminal to which the data quantity monitor 34 is connected (step 501). Next, the controller 25c compares the magnitudes of the idle band Fe and band increase a (step 502). If Fe≦α holds, the increase in band is refused (step 503). If Fe>α holds, the controller 25c assembles an OAM cell for a band-assignment increase request, which requests a band increase of α, sends the cell to the ATM network 30 via the cell concentration/distribution unit 24 (step 504) and waits for reception of an OAM cell from the network for answering the band-assignment increase request (step 505). If the OAM cell for answering the band-assignment increase request is received from the ATM network 30 via the cell concentration/distribution unit 24, the controller determines whether the answer is affirmative or negative. If the answer is negative, then the increase in band is prohibited (step 506). If the answer is affirmative, then the controller decreases the idle band Fe by α (Fe−α→Fe; step 507), increases the assigned band of the terminal by α (Fi+α→Fi), writes the result in the port accommodating data unit 22 and terminates control for band increase.

(c-2) Control for decreasing assigned band

Figure 23:
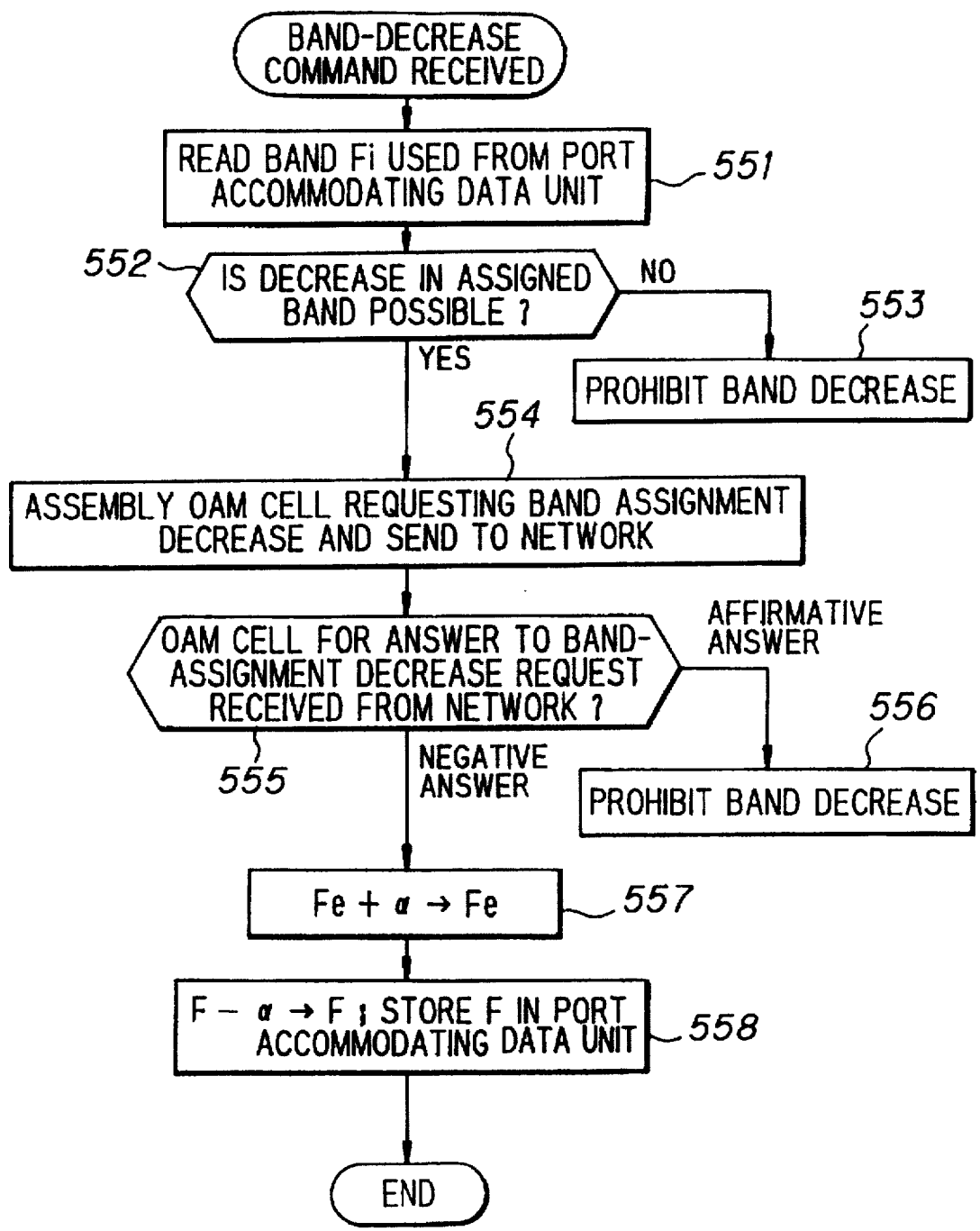
FIG. 23 is a flowchart of processing for decreasing an assigned band.

FIG. 23 is a flowchart of processing executed by the band-assignment controller 25c to control a decrease in the assigned band.

When a decrease in band is instructed by the data quantity monitor 34, the band assignment controller 25c goes to the port accommodating data unit 22 to read out various data (assigned band Fi, type of terminal, in-use flag, etc.) of the terminal to which the data quantity monitor 34 is connected (step 551). Next, the controller 25c determines whether a decrease in the assigned band is possible (step 552). If decrease is impossible, then the decrease in band is prohibited (step 553). If the decrease in band is possible, the controller 25c assembles an OAM cell for a band-assignment decrease request, which requests a band decrease of α, sends the cell to the ATM network 30 via the cell concentration/distribution unit 24 (step 554) and waits for reception of an OAM cell from the network for answering the band-assignment increase request (step 555). If the OAM cell for answering the band-assignment increase request is received from the ATM network 30 via the cell concentration/distribution unit 24, the controller determines whether the answer is affirmative or negative. If the answer is negative, then the decrease in band is prohibited (step 556). If the answer is affirmative, then the controller increases the idle band Fe by α (Fe+α→Fe; step 557), decreases the assigned band of the terminal by α (Fi−α→Fi), writes the result in the port accommodating data unit 22 and terminates control for band decrease.

(d) Graphical description of change in assigned band

Figure 24:
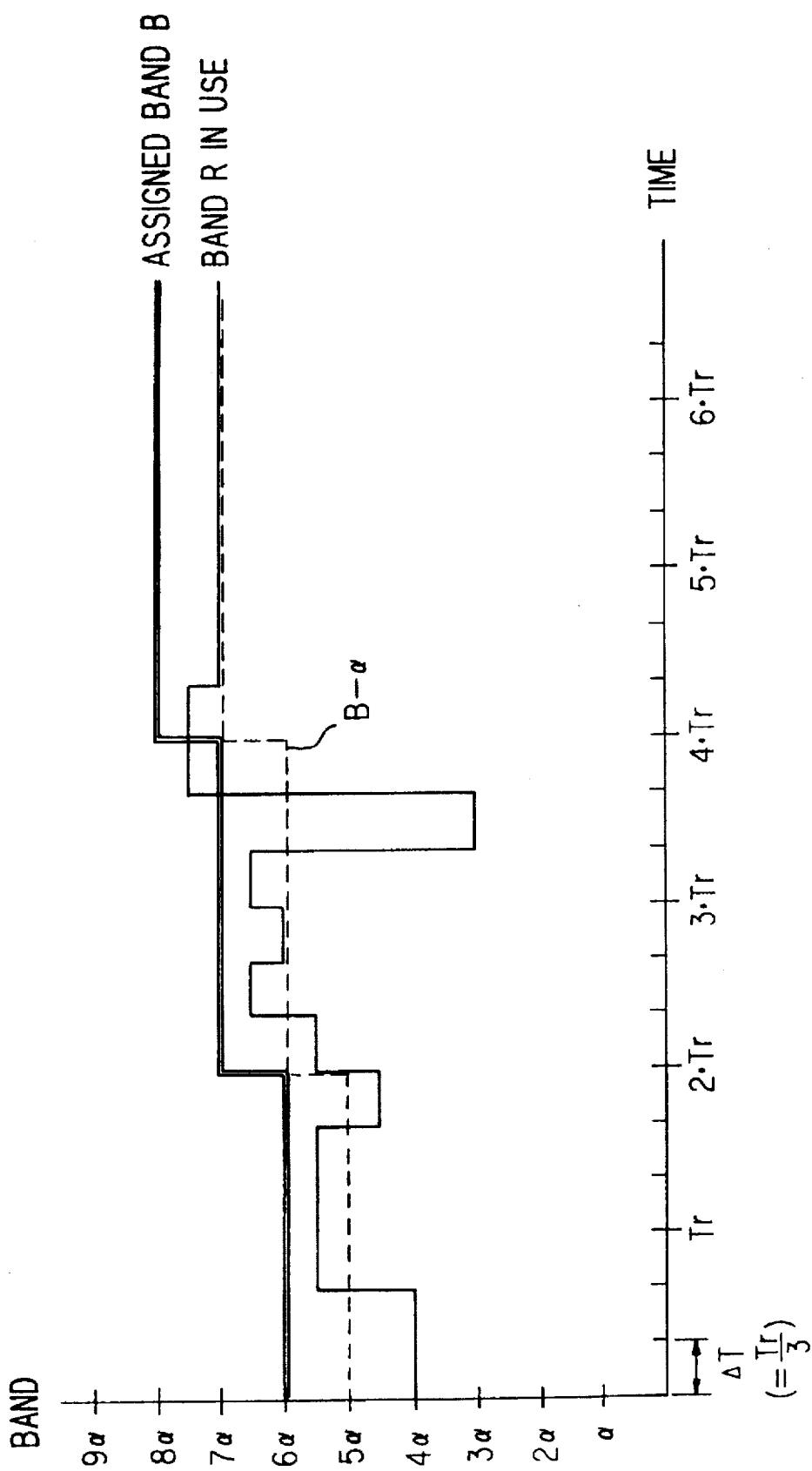
FIG. 24 is a diagram for describing an increase in assigned band.

FIG. 24 is a graphical description of an increase in assigned band. This is for a case in which ΔT=Tr/3, Nr=2 holds. In the initial interval of 0~Tr, the count N of the number of times the relation R>B−α is attained is one, and therefore no increase is band is performed. In the interval Tr~2Tr, however, N=2 holds and therefore the assigned band is increased by α. Similarly, in the interval 3Tr~4Tr, N=2 holds and therefore the assigned band is increased by α.

Figure 25:
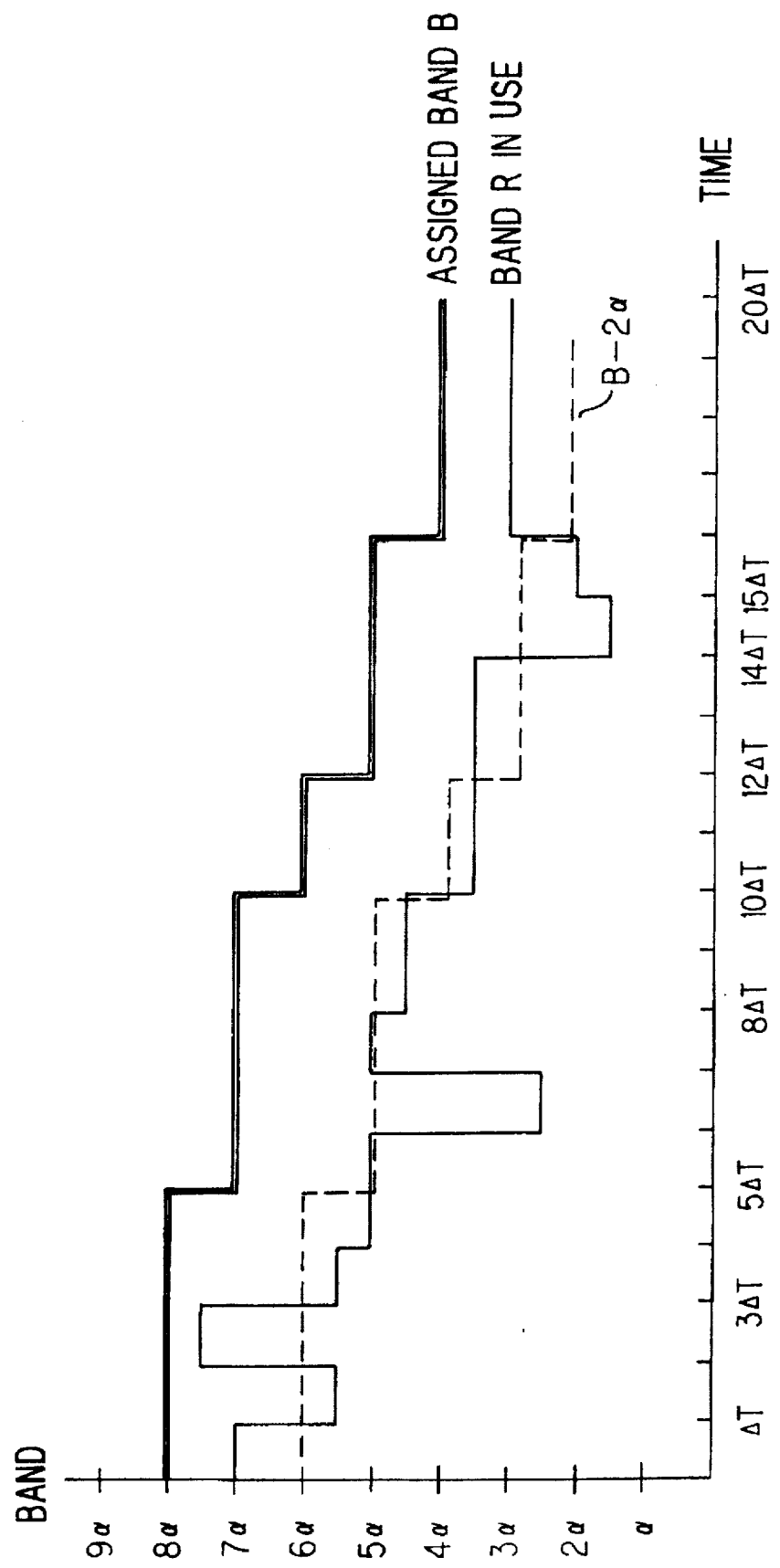
FIG. 25 is a diagram for describing a decrease in assigned band.
Figure 26:
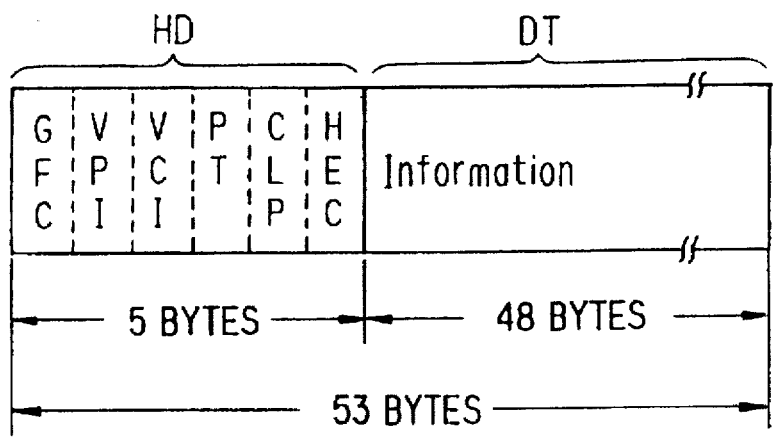
FIG. 26 is a diagram showing the constitution of an ATM cell.
Figure 27:
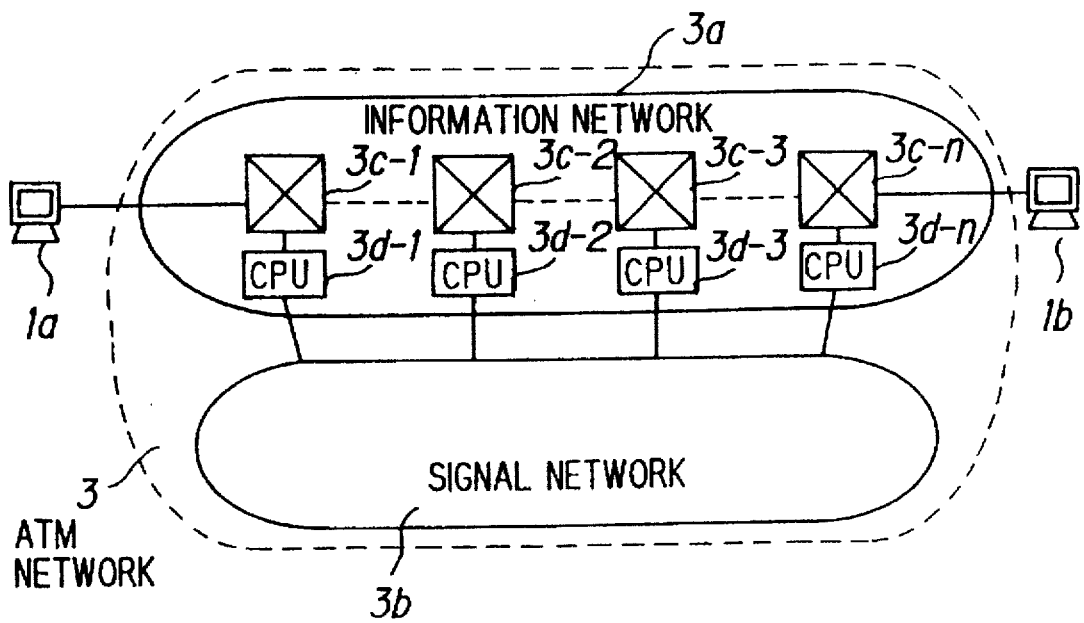
FIG. 27 is a diagram for describing the general features of an ATM network.

FIG. 25 is a graphical description of a decrease in assigned band. This is for a case in which Mr=2 holds. The count M of the number of times the relation R<B−2α is attained successively in the intervals 3ΔT ~5ΔT, 8ΔT~10ΔT, ... is two. Therefore, the assigned band is decreased by α in each instance.

In the initial interval of 0~Tr, the count N of the number of times R>B−α is attained is one, and therefore no increase is band is performed. In the interval Tr~2Tr, however, N=2 holds and therefore the assigned band is increased by α. Similarly, in the interval 3Tr~4Tr, N=2 holds and therefore the assigned band is increased by α.

(D) Modification

In the foregoing, call set-up/release control based upon the absence/presence of valid data (first embodiment) and band increase/decrease control based upon the value of the data transfer rate (second embodiment) are executed separately. However, an arrangement can be adopted in which these two embodiments are combined to perform both types of control, as shown in FIG. 1. In such case the call processor of the cell extraction/insertion unit and the band assignment controller can be realized by a single microcomputer.

Thus, in accordance with the present invention, call set-up and call release are carried out based upon the absence/presence of valid data. Therefore, if data is not being sent from a terminal, the band assigned to this terminal can be released and assigned to another terminal so that the band can be used effectively.

Further, in accordance with the present invention, even if a terminal is an SVC service terminal or a PVC service terminal, the band assigned to this terminal beforehand is used in response to the presence of valid data and the band is released in the absence of valid data, thereby allowing the band to be utilized effectively.

Further, in accordance with the present invention, an arrangement is adopted in which the port accommodating data unit and call processor are provided so as to be shared by each port, cells outputted by the cell assembly/disassembly unit and call processor provided to correspond to each port are multiplexed and sent to the network, and a cell concentrating/distributing unit for distributing multiplexed cells that have entered from the network to a prescribed cell assembly/disassembly unit or to the call processor is provided so as to be shared by each port. As a result, it is possible to reduce the number of facilities required when the system is constructed.

Further, in accordance with the present invention, the transfer rate of data is detected and the assigned band is changed dynamically depending upon the value of the transfer rate. This makes it possible to utilize the band effectively while avoiding congestion of the network.

Further, in accordance with the present invention, a band is assigned to a terminal at a peak cell rate, and call set-up/release processing and assigned-band increase/decrease control are carried out based upon the absence/presence of valid data and the actual data transfer rate. As a result, effective utilization of band can be achieved while providing the service quality (cell discard rate, delay) required by the user.

As many apparently widely different embodiments of the present invention can be made without departing from the spirit and scope thereof, it is to be understood that the invention is not limited to the specific embodiments thereof except as defined in the appended claims.

What is claimed is:

1. A cell assembly and disassembly apparatus for accommodating a plurality of terminals in a network and managing a band assigned to each terminal, comprising:

storage means for storing, in correspondence with each terminal, an assigned band of said terminal and whether the terminal is a terminal which accommodates a switched virtual channel service (first service) or a permanent virtual channel service (second service);

a data absence/presence detecting unit for detecting absence/presence of data sent from each terminal;

call processing means which, when data sent from a terminal is detected, determines whether the assigned band of said terminal is smaller than a present idle band of the network and, if the terminal is the first service terminal in a case where the assigned band is smaller, executes call set-up processing and decreases the idle band by an amount equivalent to the assigned band of the first service terminal, and which, when absence of data from the first service terminal is detected, executes call release processing and increases the idle band by an amount equivalent to the assigned band of the first service terminal; and a cell assembly/disassembly unit for assembling data into a cell after establishment of connection by the call set-up processing, sending the cell to the network, disassembling a data cell from the network into data and sending this data to a terminal.

2. The apparatus according to claim 1, wherein said call processing means sends the network an operation, administration, and maintenance (OAM) cell for band assignment in a case where said terminal is the second service terminal, decreases the idle band by an amount equivalent to the assigned band of the PVC terminal when an affirmative response to said OAM cell for band assignment is received from the network, sends the network an OAM cell for band assignment cancellation when absence of data from the second service terminal is detected and increases the idle band by an amount equivalent to the assigned band of the second service terminal when an affirmative response to said OAM cell for band assignment cancellation is received from the network.

3. The apparatus according to claim 1, wherein said storage means and said call processing means are provided so as to be shared by each of the terminals and said cell assembly/disassembly unit is provided for each individual terminal, said apparatus further comprising cell concentration/distribution means for multiplexing a data cell outputted by each cell assembly/disassembly unit and a cell outputted by said call processing means, sending these cells to the network, and distributing multiplexed cells, which have entered from said network, to a prescribed cell assembly/disassembly unit or to said call processing means.

4. The apparatus according to claim 1, wherein said data absence/presence detecting unit detects absence/presence of valid data every unit of time, obtains a count of number of times valid data is detected per set time, and judges that data is present in a case where said count of number of times valid data is detected is greater than a set count.

5. The apparatus according to claim 1, wherein said data absence/presence detecting unit detects absence/presence of valid data every unit of time and judges that data is absent in a case where valid data fails to be detected successively a set number of times.

6. The apparatus according to claim 1, further comprising:

a data quantity monitor for monitoring a quantity of data sent from a terminal; and a band assignment controller which, in a case where transfer rate of data sent from a terminal is high, sends the network an operation, administration and maintenance (OAM) cell for requesting band increase and increases the assigned band of said terminal by a prescribed amount and decreases an idle band by an amount equivalent to the increase in said assigned band when an affirmative response to said OAM cell for requesting band increase is received from the network, and which, in a case where transfer rate of data sent from a terminal is low, sends the network an OAM cell for requesting band decrease and decreases the assigned band of said terminal by a prescribed amount and increases an idle band by an amount equivalent to the decrease in the assigned band when an affirmative response to said OAM cell for requesting band decrease is received from the network.

7. The apparatus according to claim 6, wherein said data quantity monitor detects, at prescribed time intervals, whether transfer rate of data sent from a terminal is greater than a first set value, counts the number of times the transfer rate is greater than the first set value, and issues said band assignment controller a command to increase the band when the count of said number of times per set time is greater than a set count, and said band assignment controller responds to said command by sending the network said OAM cell for requesting band increase.

8. The apparatus according to claim 6, wherein said data quantity monitor detects, at prescribed time intervals, whether transfer rate of data sent from a terminal is less than a second set value, issues said band assignment controller a command to decrease the band when the transfer rate is less than the second set value successively a number of times greater than a set number of time, and said band assignment controller responds to said command by sending the network said OAM cell for requesting band decrease.

9. A cell assembly and disassembly apparatus for accommodating a plurality of terminals in an ATM network and managing a band assigned to each terminal, comprising:

means for storing an assigned band of each terminal;

a data quantity monitor for monitoring a quantity of data sent from each terminal;

a band assignment controller which, in a case where transfer rate of data sent from a terminal is high, sends the network an operation, administration, and maintenance (OAM) cell for requesting band increase and increases the assigned band of said terminal by a prescribed amount and decreases an idle band by an amount equivalent to the increase in said assigned band when an affirmative response to said OAM cell for requesting band increase is received from the network, and which, in a case where transfer rate of data sent from a terminal is low, sends the network an OAM cell for requesting band decrease and decreases the assigned band of said terminal by a prescribed amount and increases an idle band by an amount equivalent to the decrease in the assigned band when an affirmative response to said OAM cell for requesting band decrease is received from the network; and a cell assembly/disassembly unit for assembling data into a cell, sending the cell to the network, disassembling a data cell from the network into data and sending the data to a terminal.

10. The apparatus according to claim 9, wherein said storage means and said call processing means are provided so as to be shared by each of the terminals and said cell assembly/disassembly unit is provided for each individual terminal, said apparatus further comprising cell concentration/distribution means for multiplexing a data cell outputted by each cell assembly/disassembly unit and a cell outputted by said call processing means, sending these cells to the network, and distributing multiplexed cells, which have entered from said network, to a prescribed cell assembly/disassembly unit or to said call processing means.

11. The apparatus according to claim 9, wherein said data quantity monitor detects, at prescribed time intervals, whether transfer rate of data sent from a terminal is greater than a first set value, counts the number of times the transfer rate is greater than the first set value, and issues said band assignment controller a command to increase the band when the count of said number of times per set time is greater than a set count, and said band assignment controller responds to said command by sending the network said OAM cell for requesting band increase.

12. The apparatus according to claim 9, wherein said data quantity monitor detects, at prescribed time intervals, whether transfer rate of data sent from a terminal is less than a second set value, issues said band assignment controller a command to decrease the band when the transfer rate is less than the second set value successively a number of times greater than a set number of time, and said band assignment controller responds to said command by sending the network said OAM cell for requesting band decrease.

13. A cell assembly and disassembly apparatus for accommodating a terminal in a network and managing a band assigned to the terminal, comprising:

a storage unit for storing an assigned band of said terminal and whether the terminal is a terminal which accommodates a first service or a second service;

a data absence/presence detecting unit for detecting absence/presence of data sent from the terminal;

a call processor which, when data sent from the terminal is detected, determines whether the assigned band of said terminal is smaller than a present idle band of the network and, if the terminal is the first service terminal in a case where the assigned band is smaller, executes call set-up processing and decreases the idle band by an amount equivalent to the assigned band of the first service terminal;

a data cell assembly/disassembly unit for assembling data into a data cell after establishment of connection by the call set-up processing, sending the data cell to the network, disassembling a data cell from the network into data and sending this data to the terminal.

14. The apparatus according to claim 13, wherein said call processor executes call release processing and increases the idle band by an amount equivalent to the assigned band of the first service terminal when absence of data from the first terminal is detected.

15. The apparatus according to claim 14, wherein said call processor sends the network a cell for band assignment in a case where said terminal is the second service terminal, decreases the idle band by an amount equivalent to the assigned band of the second service terminal when an affirmative response to said cell for band assignment is received from the network, sends the network a cell for band assignment cancellation when absence of data from the second service terminal is detected and increases the idle band by an amount equivalent to the assigned band of the second service terminal when an affirmative response to said cell for band assignment cancellation is received from the network.

16. A cell assembly and disassembly apparatus for accommodating a terminal in a network and managing a band assigned to the terminal, comprising:

a storage unit for storing an assigned band of said terminal and whether the terminal is a terminal which accommodates a first service or a second service;

a data absence/presence detecting unit for detecting absence/presence of data sent from the terminal;

a call processor which, when data sent from the terminal is detected, determines whether the assigned band of said terminal is smaller than a present idle band of the network, and sends the network a cell for band assignment in a case where said terminal is the second service terminal, decreases the idle band by an amount equivalent to the assigned band of the second service terminal when an affirmative response to said cell for band assignment is received from the network; and a data cell assembly/disassembly unit for assembling data into a data cell sending the data cell to the network, disassembling a data cell from the network into data and sending this data to the terminal.

17. The apparatus according to claim 16, wherein said call processor sends the network a cell for band assignment cancellation when absence of data from the second service terminal is detected and increases the idle band by an amount equivalent to the assigned band of the second service terminal when an affirmative response to said cell for band assignment cancellation is received from the network.

18. The apparatus according to claim 17, wherein said call processor executes call set-up processing if the terminal is the first service terminal in a case where the assigned band is smaller, and decreases the idle band by an amount equivalent to the assigned band of the first service terminal, and which, when absence of data from the first service terminal is detected, executes call release processing and increases the idle band by an amount equivalent to the assigned band of the first service terminal.

* * * * *